United States Patent
Gardner et al.

(10) Patent No.: US 11,354,216 B2
(45) Date of Patent: Jun. 7, 2022

(54) MONITORING PERFORMANCE DEVIATIONS

(71) Applicant: MicroStrategy Incorporated, Vienna, VA (US)

(72) Inventors: Richard Gardner, Leesburg, VA (US); Clayton Myers, Oak Hill, VA (US); Andrew Smith, Oakton, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 17/024,050

(22) Filed: Sep. 17, 2020

(65) Prior Publication Data

US 2021/0081298 A1 Mar. 18, 2021

Related U.S. Application Data

(60) Provisional application No. 62/902,098, filed on Sep. 18, 2019.

(51) Int. Cl.
| | |
|---|---|
| *G06F 11/00* | (2006.01) |
| *G06F 11/34* | (2006.01) |
| *G06F 11/30* | (2006.01) |

(52) U.S. Cl.
CPC ...... *G06F 11/3495* (2013.01); *G06F 11/3006* (2013.01)

(58) Field of Classification Search
CPC ............. G06F 11/3006; G06F 11/3495; G06F 11/0754
See application file for complete search history.

(56) References Cited

U.S. PATENT DOCUMENTS

| | | |
|---|---|---|
| 5,758,071 A | 5/1998 | Burgess et al. |
| 6,085,244 A | 7/2000 | Wookey |
| 6,282,175 B1 | 8/2001 | Steele et al. |
| 6,334,158 B1 | 12/2001 | Jennyc et al. |
| 6,338,149 B1 | 1/2002 | Ciccone, Jr. et al. |
| 6,339,795 B1 | 1/2002 | Narukar et al. |
| 6,449,739 B1 | 9/2002 | Landan |
| 6,473,794 B1 | 10/2002 | Guheen et al. |

(Continued)

OTHER PUBLICATIONS

U.S. Office Action in U.S. Appl. No. 16/557,482, dated Nov. 30, 2020, 13 pages.

(Continued)

*Primary Examiner* — Elmira Mehrmanesh
(74) *Attorney, Agent, or Firm* — Fish & Richardson P.C.

(57) ABSTRACT

Methods, systems, and apparatus, including computer programs encoded on a computer storage medium, for monitoring performance deviations. In some implementations, a workflow that is configured to monitor performance of an operation of one or more computers is run. In running the workflow, a performance measure for the operation is determined. In running the workflow, a reference performance level for the operation is determined. In running the workflow, it is determined whether the performance measure indicates a deviation from the reference performance level for the operation. In running the workflow, an action specified by the workflow is selectively performed based on whether the performance measure is determined to indicate a deviation from the reference performance level for the operation.

19 Claims, 10 Drawing Sheets

(56) References Cited

U.S. PATENT DOCUMENTS

| | | |
|---|---|---|
| 6,691,067 B1 | 2/2004 | Ding et al. |
| 6,691,245 B1 | 2/2004 | DeKoning |
| 6,792,393 B1 | 9/2004 | Farel et al. |
| 6,816,871 B2 | 11/2004 | Lee |
| 6,934,934 B1 | 8/2005 | Baker et al. |
| 6,964,051 B1 | 11/2005 | Palaniappan |
| 6,993,747 B1 | 1/2006 | Friedman |
| 7,024,548 B1 | 4/2006 | O'Toole, Jr. |
| 7,035,919 B1 | 4/2006 | Eismann et al. |
| 7,047,177 B1 | 5/2006 | Eismann et al. |
| 7,051,098 B2 | 5/2006 | Masters et al. |
| 7,089,347 B2 | 8/2006 | Mogi et al. |
| 7,155,462 B1 | 12/2006 | Singh et al. |
| 7,197,559 B2 | 3/2007 | Goldstein et al. |
| 7,346,676 B1 | 3/2008 | Swildens et al. |
| 7,389,216 B2 | 6/2008 | Parent et al. |
| 7,523,447 B1 | 4/2009 | Callahan et al. |
| 7,552,438 B1 * | 6/2009 | Werme ................. G06F 9/4856 718/104 |
| 7,581,011 B2 | 8/2009 | Teng |
| 7,617,486 B2 | 11/2009 | Sharma et al. |
| 7,657,871 B2 | 2/2010 | Velupillai |
| 7,784,049 B1 | 8/2010 | Gandler |
| 7,802,174 B2 | 9/2010 | Teng et al. |
| 7,917,617 B1 | 3/2011 | Ponnapur et al. |
| 7,937,655 B2 | 5/2011 | Teng et al. |
| 8,024,299 B2 | 9/2011 | Dias et al. |
| 8,099,727 B2 | 1/2012 | Bahat et al. |
| 8,219,432 B1 | 7/2012 | Bradley et al. |
| 8,260,893 B1 | 9/2012 | Bandhole et al. |
| 8,285,681 B2 | 10/2012 | Prahlad et al. |
| 8,554,918 B1 | 10/2013 | Douglis |
| 8,583,769 B1 | 11/2013 | Peters et al. |
| 8,595,364 B2 | 11/2013 | Levy et al. |
| 8,595,714 B1 | 11/2013 | Hamer et al. |
| 8,612,599 B2 | 12/2013 | Tung et al. |
| 8,732,604 B2 | 5/2014 | Okamoto et al. |
| 8,805,970 B2 | 8/2014 | Breh et al. |
| 8,819,171 B2 | 8/2014 | Chakraborty et al. |
| 8,892,954 B1 | 11/2014 | Gray et al. |
| 8,990,778 B1 | 3/2015 | Allocca et al. |
| 9,047,017 B1 | 6/2015 | Dolan et al. |
| 9,053,220 B2 | 6/2015 | Banks et al. |
| 9,110,496 B1 | 8/2015 | Michelsen |
| 9,164,874 B1 | 10/2015 | Tonnay et al. |
| 9,166,895 B1 * | 10/2015 | Sivaraman .......... G06F 11/3409 |
| 9,189,294 B2 | 11/2015 | Considine et al. |
| 9,262,150 B2 | 2/2016 | Haserodt et al. |
| 9,268,663 B1 | 2/2016 | Siddiqui et al. |
| 9,270,449 B1 | 2/2016 | Tribble et al. |
| 9,311,161 B2 | 4/2016 | Jagtap |
| 9,367,305 B1 | 6/2016 | Kumar et al. |
| 9,424,172 B1 | 8/2016 | Helder |
| 9,436,535 B2 * | 9/2016 | Ricken ................ G06F 11/0754 |
| 9,491,072 B2 | 11/2016 | Raghunathan et al. |
| 9,531,604 B2 | 12/2016 | Akolkar et al. |
| 9,674,294 B1 | 6/2017 | Gonthier et al. |
| 9,716,624 B2 | 7/2017 | Zeyliger et al. |
| 9,733,921 B1 | 8/2017 | Saenz et al. |
| 9,762,450 B2 | 9/2017 | Xie |
| 9,766,962 B2 | 9/2017 | Dvir et al. |
| 9,767,312 B2 | 9/2017 | Sahoo et al. |
| 9,811,849 B2 | 11/2017 | Bursey |
| 9,820,224 B2 | 11/2017 | Hui et al. |
| 9,928,210 B1 | 3/2018 | Zhang et al. |
| 9,959,104 B2 | 5/2018 | Chen et al. |
| 9,965,261 B2 | 5/2018 | Chen et al. |
| 9,986,427 B2 | 5/2018 | Kimpe |
| 10,002,247 B2 | 6/2018 | Suarez et al. |
| 10,007,509 B1 | 6/2018 | Quershi et al. |
| 10,169,023 B2 | 1/2019 | Ciano et al. |
| 10,191,778 B1 | 1/2019 | Yang et al. |
| 10,241,778 B2 | 3/2019 | Emeis et al. |
| 10,244,034 B2 | 3/2019 | Joshi et al. |
| 10,261,782 B2 | 4/2019 | Suarez et al. |
| 10,303,455 B2 | 5/2019 | Fitzgerald et al. |
| 10,310,949 B1 | 6/2019 | Chakraborty et al. |
| 10,318,280 B2 | 6/2019 | Islam et al. |
| 10,356,214 B2 | 7/2019 | Joshi et al. |
| 10,389,582 B1 | 8/2019 | Fakhouri et al. |
| 10,440,153 B1 | 10/2019 | Smith et al. |
| 10,452,440 B1 | 10/2019 | Odulinski et al. |
| 10,474,548 B2 | 11/2019 | Sanakkayala et al. |
| 10,803,411 B1 * | 10/2020 | Smith .............. G06Q 10/06315 |
| 10,810,041 B1 | 10/2020 | Myers et al. |
| 10,997,052 B2 | 5/2021 | Khosrowpour et al. |
| 10,997,135 B2 * | 5/2021 | Zoll ..................... G06K 9/6256 |
| 11,025,707 B1 | 6/2021 | Luker |
| 11,102,330 B2 | 8/2021 | Gardner et al. |
| 11,102,331 B2 | 8/2021 | Smith et al. |
| 2002/0065833 A1 | 5/2002 | Litvin |
| 2002/0122422 A1 | 9/2002 | Keney et al. |
| 2002/0124243 A1 | 9/2002 | Broeksteeg et al. |
| 2002/0157089 A1 | 10/2002 | Patel et al. |
| 2002/0198985 A1 | 12/2002 | Fraenkel et al. |
| 2003/0135382 A1 * | 7/2003 | Marejka ............. G06F 11/3495 709/232 |
| 2004/0060044 A1 | 3/2004 | Das et al. |
| 2004/0068424 A1 | 4/2004 | Lee et al. |
| 2006/0129870 A1 | 6/2006 | Parent et al. |
| 2006/0236056 A1 | 10/2006 | Nagata |
| 2007/0038931 A1 | 2/2007 | Allaire et al. |
| 2008/0077366 A1 | 3/2008 | Neuse et al. |
| 2008/0097960 A1 | 4/2008 | Dias et al. |
| 2008/0109448 A1 | 5/2008 | Aboel-Nil et al. |
| 2008/0115195 A1 | 5/2008 | Malek et al. |
| 2008/0163092 A1 | 7/2008 | Rao |
| 2008/0243660 A1 | 10/2008 | Amemiya et al. |
| 2008/0247314 A1 | 10/2008 | Kim et al. |
| 2008/0301663 A1 | 12/2008 | Bahat et al. |
| 2009/0018996 A1 | 1/2009 | Hunt et al. |
| 2009/0063699 A1 | 3/2009 | Chapweske et al. |
| 2009/0070462 A1 | 3/2009 | Saenz et al. |
| 2009/0282401 A1 | 11/2009 | Todorova |
| 2010/0153780 A1 | 6/2010 | Kirtkow |
| 2010/0162406 A1 | 6/2010 | Benameur et al. |
| 2010/0250487 A1 | 9/2010 | Gabriel et al. |
| 2010/0318986 A1 | 12/2010 | Burke et al. |
| 2011/0054968 A1 | 3/2011 | Galaviz |
| 2011/0055823 A1 | 3/2011 | Nichols et al. |
| 2011/0099290 A1 | 4/2011 | Swildens et al. |
| 2011/0145525 A1 | 6/2011 | Browne et al. |
| 2011/0314344 A1 | 12/2011 | Okamoto et al. |
| 2012/0054095 A1 | 3/2012 | Lesandro et al. |
| 2012/0096149 A1 | 4/2012 | Sunkara et al. |
| 2012/0117620 A1 | 5/2012 | Cassidy |
| 2012/0167094 A1 | 6/2012 | Suit |
| 2012/0198279 A1 | 8/2012 | Schroeder |
| 2012/0290950 A1 | 11/2012 | Rapaport et al. |
| 2012/0310765 A1 | 12/2012 | Masters |
| 2013/0042123 A1 | 2/2013 | Smith et al. |
| 2013/0054792 A1 | 2/2013 | Sharaf |
| 2013/0080514 A1 | 3/2013 | Gupta et al. |
| 2013/0197863 A1 | 8/2013 | Rayate et al. |
| 2013/0297769 A1 | 11/2013 | Chang et al. |
| 2013/0311740 A1 | 11/2013 | Watanabe et al. |
| 2013/0339299 A1 | 12/2013 | Muller et al. |
| 2014/0019387 A1 | 1/2014 | Cao et al. |
| 2014/0020048 A1 | 1/2014 | Snodgrass |
| 2014/0089033 A1 | 3/2014 | Snodgrass |
| 2014/0089505 A1 | 3/2014 | Haserodt et al. |
| 2014/0156839 A1 | 6/2014 | Swildens et al. |
| 2014/0165063 A1 | 6/2014 | Shiva et al. |
| 2014/0282456 A1 | 9/2014 | Drost et al. |
| 2014/0331209 A1 | 11/2014 | Singh |
| 2014/0331225 A1 | 11/2014 | Helander et al. |
| 2014/0358944 A1 | 12/2014 | Brower, Jr. et al. |
| 2015/0019195 A1 | 1/2015 | Davis |
| 2015/0019197 A1 | 1/2015 | Higginson et al. |
| 2015/0019488 A1 | 1/2015 | Balch et al. |
| 2015/0019706 A1 | 1/2015 | Raghunathan et al. |
| 2015/0081574 A1 | 3/2015 | Selby et al. |
| 2015/0089479 A1 | 3/2015 | Chen et al. |
| 2015/0095892 A1 | 4/2015 | Baggott et al. |

(56) References Cited

U.S. PATENT DOCUMENTS

| | | | |
|---|---|---|---|
| 2015/0100829 A1 | 4/2015 | Nanjundappa et al. |
| 2015/0178052 A1 | 6/2015 | Gupta et al. |
| 2015/0220426 A1 | 8/2015 | Spektor et al. |
| 2015/0242636 A1 | 8/2015 | Khan et al. |
| 2015/0287101 A1 | 10/2015 | Baldwin et al. |
| 2015/0295792 A1 | 10/2015 | Cropper et al. |
| 2015/0326432 A1 | 11/2015 | Fujie et al. |
| 2015/0373097 A1 | 12/2015 | Konkus et al. |
| 2016/0026555 A1 | 1/2016 | Kuo et al. |
| 2016/0044040 A1 | 2/2016 | Caffary, Jr. |
| 2016/0055067 A1 | 2/2016 | Bensinger |
| 2016/0072730 A1 | 3/2016 | Jurban et al. |
| 2016/0132320 A1 | 5/2016 | Fitzgerald et al. |
| 2016/0139887 A1 | 5/2016 | Pudiyapura et al. |
| 2016/0164738 A1 | 6/2016 | Pinski et al. |
| 2016/0277249 A1 | 9/2016 | Singh et al. |
| 2016/0294614 A1 | 10/2016 | Searle et al. |
| 2016/0335106 A1 | 11/2016 | Behere et al. |
| 2016/0335108 A1 | 11/2016 | Ryu et al. |
| 2016/0337186 A1 | 11/2016 | Dolinsky et al. |
| 2016/0344610 A1 | 11/2016 | Robinette |
| 2016/0350205 A1 | 12/2016 | Acharya et al. |
| 2016/0371170 A1* | 12/2016 | Salunke ............... G06F 11/3608 |
| 2017/0034023 A1 | 2/2017 | Nickolov et al. |
| 2017/0041201 A1 | 2/2017 | Ilyadis et al. |
| 2017/0061313 A1 | 3/2017 | Oros et al. |
| 2017/0090972 A1 | 3/2017 | Ryu et al. |
| 2017/0147319 A1 | 5/2017 | Riek et al. |
| 2017/0154017 A1 | 6/2017 | Kristiansson et al. |
| 2017/0161105 A1 | 6/2017 | Barrett et al. |
| 2017/0177860 A1 | 6/2017 | Suarez et al. |
| 2017/0185488 A1 | 6/2017 | Kumarasamy et al. |
| 2017/0270455 A1 | 9/2017 | Chi et al. |
| 2017/0295199 A1 | 10/2017 | Kirti et al. |
| 2017/0300311 A1 | 10/2017 | Lopez et al. |
| 2017/0315795 A1 | 11/2017 | Keller |
| 2017/0315981 A1 | 11/2017 | Shrestha et al. |
| 2018/0013616 A1 | 1/2018 | Abadi et al. |
| 2018/0075086 A1 | 3/2018 | Yam et al. |
| 2018/0075202 A1 | 3/2018 | Davis et al. |
| 2018/0083995 A1 | 3/2018 | Sheth et al. |
| 2018/0088926 A1 | 3/2018 | Abrams |
| 2018/0088935 A1 | 3/2018 | Church et al. |
| 2018/0095778 A1 | 4/2018 | Aydelott et al. |
| 2018/0095973 A1 | 4/2018 | Huang et al. |
| 2018/0114126 A1 | 4/2018 | Das et al. |
| 2018/0136931 A1 | 5/2018 | Hendrich et al. |
| 2018/0157516 A1 | 6/2018 | Kristiansson et al. |
| 2018/0173502 A1 | 6/2018 | Biskup et al. |
| 2018/0173522 A1 | 6/2018 | Hamill et al. |
| 2018/0205652 A1 | 7/2018 | Saxena |
| 2018/0267908 A1 | 9/2018 | Pan et al. |
| 2018/0285199 A1 | 10/2018 | Mitkar et al. |
| 2018/0285210 A1 | 10/2018 | Mitkar et al. |
| 2018/0285246 A1 | 10/2018 | Tuttle et al. |
| 2018/0285353 A1 | 10/2018 | Rao et al. |
| 2018/0287902 A1* | 10/2018 | Chitalia ............... H04L 43/045 |
| 2018/0288129 A1 | 10/2018 | Joshi et al. |
| 2018/0330293 A1 | 11/2018 | Kulkarni et al. |
| 2018/0341471 A1 | 11/2018 | Stefanov et al. |
| 2019/0034313 A1 | 1/2019 | Vedurumudi et al. |
| 2019/0042900 A1 | 2/2019 | Smith et al. |
| 2019/0050680 A1 | 2/2019 | Waugh et al. |
| 2019/0095254 A1 | 3/2019 | Rao |
| 2019/0102204 A1 | 4/2019 | Khosrowpour et al. |
| 2019/0109822 A1 | 4/2019 | Clark et al. |
| 2019/0109857 A1 | 4/2019 | Caffary, Jr. |
| 2019/0132329 A1 | 5/2019 | Verberkt et al. |
| 2019/0163559 A1 | 5/2019 | Takahashi et al. |
| 2019/0208031 A1 | 7/2019 | Bennet et al. |
| 2019/0213068 A1* | 7/2019 | Upadhyay ............ G06F 11/3034 |
| 2019/0230130 A1 | 7/2019 | Beckman et al. |
| 2019/0235897 A1 | 8/2019 | Goel |
| 2019/0236844 A1 | 8/2019 | Balasian et al. |
| 2019/0260716 A1 | 8/2019 | Lerner |
| 2019/0278669 A1 | 9/2019 | Mueller-Wicke et al. |
| 2019/0288956 A1 | 9/2019 | Pulier et al. |
| 2019/0303541 A1 | 10/2019 | Reddy et al. |
| 2019/0312800 A1 | 10/2019 | Schibler et al. |
| 2019/0317829 A1* | 10/2019 | Brown ................ G06F 11/3442 |
| 2019/0342425 A1 | 11/2019 | Cheng et al. |
| 2019/0354389 A1 | 11/2019 | Du et al. |
| 2019/0392045 A1 | 12/2019 | De Lima Junior et al. |
| 2020/0019393 A1 | 1/2020 | Vichare et al. |
| 2020/0067763 A1 | 2/2020 | Vytla |
| 2020/0081814 A1 | 3/2020 | Srinivasan et al. |
| 2020/0099773 A1 | 3/2020 | Myers et al. |
| 2020/0112624 A1 | 4/2020 | Smith et al. |
| 2020/0119979 A1 | 4/2020 | Woodland et al. |
| 2020/0135264 A1 | 4/2020 | Brady |
| 2020/0177634 A1 | 6/2020 | Hwang et al. |
| 2020/0204465 A1* | 6/2020 | Baker ................. H04L 63/1425 |
| 2020/0249962 A1 | 8/2020 | Vichare et al. |
| 2020/0257612 A1 | 8/2020 | Lang et al. |
| 2020/0272786 A1 | 8/2020 | Pandurangarao et al. |
| 2020/0293436 A1 | 9/2020 | Carames et al. |
| 2020/0356806 A1 | 11/2020 | Li et al. |
| 2020/0366572 A1 | 11/2020 | Chauhan |
| 2020/0394120 A1 | 12/2020 | Salmi et al. |
| 2021/0019321 A1 | 1/2021 | Ehrlich et al. |
| 2021/0042141 A1 | 2/2021 | De Marco et al. |
| 2021/0048995 A1 | 2/2021 | Myers et al. |
| 2021/0048998 A1 | 2/2021 | Myers et al. |
| 2021/0049002 A1 | 2/2021 | Myers et al. |
| 2021/0064262 A1 | 3/2021 | Myers et al. |
| 2021/0064492 A1* | 3/2021 | Myers ..................... G06F 11/34 |
| 2021/0065078 A1 | 3/2021 | Gardner et al. |
| 2021/0067406 A1 | 3/2021 | Myers et al. |
| 2021/0067607 A1 | 3/2021 | Gardner et al. |
| 2021/0073026 A1 | 3/2021 | Myers et al. |
| 2021/0089438 A1 | 3/2021 | Gardner et al. |
| 2021/0092015 A1 | 3/2021 | Gardner et al. |
| 2021/0124610 A1 | 4/2021 | Gardner et al. |

OTHER PUBLICATIONS

U.S. Office Action in U.S. Appl. No. 16/787,596 dated Nov. 25, 2020, 11 pages.

Abbors et al., "An Automated Approach for Creating Workload Models from Server Log Data," 9th Intl Conf. on Software Engineering and Applications, 2014, pp. 1-12.

Ancillaryinsights[ online], "MicroStrategy Analytics Enterprise—Upgrade Guide", 2013, retrieved on Sep. 29, 2021, retrieved from URL <http://ancillaryinsights.com/producthelp/AnalyticsEnterprise/manuals/en/UpgradeGuide.pdf > , 122 pages.

Bedford-computing [online], "JMeter Tutorial", retrieved on Sep. 29, 2021, retrieved from URL < http://bedford-computing.co.uk/learning/wp-content/uploads/2016/03/JMeter-Tutorial.pdf >, 53 pages.

doc-archives.microstrategy.com [online], "Installation and Configuration Guide," Sep. 2018, retrieved Mar. 20, 2020, retrieved from URL <https://doc-archives.microstrategy.com/producthelp/10.11/manuals/en/InstallationConfig.pdf>, 527 pages.

Doc-archives.microstrategy.com [online], "Installing and Configuring MicroStrategy Library," Jun. 2017, retrieved on Oct. 25, 2019, retrieved from URL <https://doc-archives.microstrategy.com/producthelp/10.10/InstallConfig/WebHelp/Lang_1033/Content/install_config_library.htm>, 2 pages.

docs.docker.com [online], "Get Started, Part 1: Orientation and setup," 2017, retrieved on Oct. 25, 2019, retrieved from URL<https://docs.docker.com/get-started/>, 6 pages.

Dyn.com "Kubernetes: The Difference Between Containers and Virtual Machines," Feb. 2018, retrieved on Oct. 25, 2019, retrieved from URL <https://dyn.com/blog/kubernetes-the-difference-between-containers-and-virtual-machines/>, 8 pages.

Edureka.co [online], "Docker tutorial—Introduction to docker & containerization," 2017, retrieved on Oct. 25, 2019, retrieved from URL <https://www.edureka.co/blog/docker-tutorial>, 10 pages.

GWS Advisory [online], "What's New in Microstrategy 2019", Jan. 2019, retrieved on Oct. 8, 2021, retrieved from URL < https://www.

(56) References Cited

OTHER PUBLICATIONS gwsadvisory.com/wp-content/uploads/2019/01/whats-new-in-microstrategy-2019.pdf >, 138 pages.
HP [online], "An Introduction to HP LoadRunner software" May 2011, retrieved on Sep. 29, 2021, retrieved from URL <https://www.hp.com/sg-en/pdf/LR_technical_WP_tcm_196_1006601.pdf>, 8 pages.
Jaspersoft [online], "Performance Testing with Jmeter," 2012, retrieved on Sep. 29, 2021, retrieved from URL <https://community.jaspersoft.com/wiki/performance-testing-jmeter >, 4 pages.
Kubernetes.io [online], "Concepts underlying the cloud controller manager," May 2019, retrieved on Jun. 20, 2019, retrieved from URL <https://kubernetes.io/docs/concepts/architecture/cloud-controller/>, 9 pages.
Kubernetes.io [online], "StatefulSet is the workload API object used to manage stateful applications," Jun. 2019, retrieved on Jun. 20, 2019, retrieved from URL <https://kubernetes.io/docs/concepts/workloads/controllers/statefulset/>, 9 pages.
Linkedin.com [online], "Moving MicroStrategy to a docker/kubernetes infrastructure," Jan. 2018, retrieved from Oct. 25, 2019 retrieved from URL <https://www.linkedin.com/pulse/moving-microstrategy-dockerkubernetes-infrastructure-montero/>, 3 pages.
linuxize.com [online], "How to Remove Docker Containers, Images, Volumes, and Networks," Oct. 2018, retrieved on Oct. 25, 2019, retrieved from URL <https://linuxize.com/post/how-to-remove-docker-images-containers-volumes-and-networks/#remove-one-or-more-containers>, 11 pages.
Ma et al., "Efficient service handoff across edge servers via docker container migration author:," SEC '17: Proceedings of the Second ACM/IEEE Symposium on Edge Computing, 2017, 11:1-13.
Microfocus [online], "LoadRunner and Performance Center," Feb. 2018,retrieved on Sep. 29, 2021, retrieved from URL < https://www.microfocus.com/media/documentation/loadrunner_and_performance_center_document.pdf >, 249 pages.
MicroStrategy [online], "KB16749: What is MicroStrategy Integrity Manager?", 2019, retrieved on Sep. 29, 2021, retrieved from URL <https://community.microstrategy.com/s/article/KB16749-What-is-MicroStrategy-Integrity-Manager?language=en_US >, 2 pages.
MicroStrategy [online], "Configuring an upgrade test environment," 2019, retrieved on Sep. 29, 2021, retrieved from URL < https://doc-archives.microstrategy.com/producthelp/11.0/UpgradeGuide/WebHelp/Lang_1033/Content/configuring_an_upgrade_test_environment.htm >, 2 pages.
MicroStrategy [online], "High-level steps to configure an upgrade test environment," 2019, retrieved on Sep. 29, 2021, retrieved from URL < https://doc-archives.microstrategy.com/producthelp/11.0/UpgradeGuide/WebHelp/Lang_1033/content/high_level_steps_to_configure_an_upgrade_test_envi.htm >, 2 pages.
MicroStrategy [online], "Integrity Manager—Upgrade Impact Testing," 2019, retrieved on Sep. 29, 2021, retrieved from URL < https://www2.microstrategy.com/producthelp/2019/UpgradeGuide/en-us/Content/Integrity_testing.htm >, 2 pages.
MicroStrategy [online], "Integrity Manager Homepage," 2019, retrieved on Sep. 29, 2021, retrieved from URL < https://community.microstrategy.com/s/article/Integrity-Manager-Homepage?language=en_US >, 2 pages.
MicroStrategy [online], "MicroStrategy 10.9 Readme", 2017, retrieved on Oct. 5, 2021, 124 pages.
MicroStrategy [online], "MicroStrategy Capacity Testing Tool," 2019, retrieved on Sep. 29, 2021, retrieved from URL< https://www2.microstrategy.com/producthelp/2019/UpgradeGuide/en-us/Content/capacity_testing.htm >, 2 pages.
MicroStrategy [online], "MicroStrategy Integrity Manager" 2017, retrieved on Sep. 29, 2021, retrieved from URL < https://doc-archives.microstrategy.com/producthelp/10.4/ProjectDesignGuide/WebHelp/Lang_1033/Content/ProjectDesign/MicroStrategy_Integrity_Manager.htm >, 2 pages.
MicroStrategy [online], "MicroStrategy Upgrade Best Practices" Aug. 2019, retrieved on Sep. 29, 2021, retrieved from URL < https://community.microstrategy.com/s/article/MicroStrategy-Upgrade-Best-Practices?language=en_US >, 2 pages.
MicroStrategy [online], "Perform Basic Stability Testing," 2019, retrieved on Sep. 29, 2021, retrieved from URL < https://doc-archives.microstrategy.com/producthelp/11.0/UpgradeGuide/WebHelp/Lang_1033/Content/perform_basic_stability_testing_on_the_test_server.htm >, 2 pages.
MicroStrategy [online], "System Administration Guide", 2018, retrieved on Oct. 5, 2021, 831 pages.
MicroStrategy [online], "The Upgrade Process Checklist," 2019, retrieved on Sep. 29, 2021, retrieved from URL <https://doc-archives.microstrategy.com/producthelp/11.0/UpgradeGuide/WebHelp/Lang_1033/Content/the_upgrade_process_checklist.htm > , 3 pages.
MicroStrategy [online], "Tools to Upgrade with Confidence", Feb. 4, 2019, retrieved on Oct. 12, 2021, 26 pages.
MicroStrategy [online], "Upgrade Analysis Dossier," 2020, retrieved on Sep. 29, 2021, retrieved from URL < https://communitv.microstrategy.com/s/article/Upgrade-Analysis-Dossier?language=en_US >, 2 pages.
MicroStrategy [online], "Upgrade Guide—Upgrading your MicroStrategy Enterprise Software" Jun. 2016, retrieved on Oct. 8, 2021, retrieved from URL <https://doc-archives.microstrategy.com/producthelp/10.4/manuals/en/UpgradeGuide.pdf >, 109 pages.
MicroStrategy [online], "Upgrade Guide—Version 10" 2015, retrieved on Oct. 8, 2021, retrieved from URL <https://doc-archives.microstrategy.com/producthelp/10/manuals/en/UpgradeGuide.pdf >, 118 pages.
MicroStrategy [online], "Upgrade Guide—Version 10. 9" Sep. 2017, retrieved on Oct. 8, 2021, retrieved from URL <https://www2.microstrategy.com/producthelp/10.9/manuals/en/UpgradeGuide.pdf>, 90 pages.
MicroStrategy [online], "Upgrade Guide—Version 10.11" Jun. 2018, retrieved on Oct. 8, 2021, retrieved from URL < https://www2.microstrategy.com/producthelp/10.11/manuals/en/UpgradeGuide.pdf >, 92 pages.
MicroStrategy.com [online], "Microstrategy on Kubernetes," 2017, retrieved on Oct. 25, 2019, retrieved from URL <https://www.microstrategy.com/getmedia/d99b44dc-ec44-451b-a5a3-3db7160282f0/Genesys-How-to-run-MicroStrategy-on-Kubernetes>, 10 pages.
Pederson, "Testing SharePoint Apps in Production (Canary Release)" Simon J.K. Pedersen's Azure & Docker blog, 2014, 1-9.
Singh et al., "Container-based microservice architecture for cloud applications," 2017 International Conference on Computing, Communication and Automation (ICCCA), May 2017, 847-52.
Stackoverflow.com [online] "What's the difference between ClusterIP, NodePort and LoadBalancer service types in Kubernetes?" Jan. 2017, retrieved from URL <https://stackoverflow.com/questions/41509439/whats-the-difference-between-clusterip-nodeport-and-loadbalancer-service-types/52241241#52241241>, 6 pages.
Tao et al., "Dynamic Resource Allocation Algorithm for Container-based Service Computing"; 2017 IEEE 13th International Symposium on Autonomous Decentralized Systems—2017 IEEE, 61-67.
Tuton, "Deploy A MongoDB replica set using the IBM Cloud Kubernetes Service," IBM Developer, Mar. 15, 2018, 14 pages.
Tutorialspoint [online], "JMETER—Quick Guide," 2007, retrieved on Sep. 29, 2021, retrieved from URL <https://www.tutorialspoint.com/jmeter/pdf/jmeter_quick_guide.pdf >, 49 pages.
U.S. Office Action in U.S. Appl. No. 16/556,636, dated Jun. 8, 2021, 7 pages.
U.S. Office Action in U.S. Appl. No. 16/582,874, dated May 19, 2021, 23 pages.
U.S. Office Action in U.S. Appl. No. 16/582,874, dated Nov. 13, 2020, 21 pages.
U.S. Office Action in U.S. Appl. No. 17/028,565, dated Oct. 22, 2021, 9 pages.
U.S. Office Action in U.S. Appl. No. 16/542,023, dated Mar. 12, 2021, 15 pages.
U.S. Office Action in U.S. Appl. No. 16/556,636 , dated Aug. 18, 2021, 8 pages.
U.S. Office Action in U.S. Appl. No. 16/582,874 , dated Sep. 16, 2021, 30 pages.
U.S. Office Action in U.S. Appl. No. 16/815,788, dated Sep. 7, 2021, 27 pages.
U.S. Office Action in U.S. Appl. No. 16/557,713, dated Aug. 5, 2021, 39 pages.

(56) References Cited

OTHER PUBLICATIONS

U.S. Office Action in U.S. Appl. No. 16/557,713, dated Feb. 24, 2021, 34 pages.
U.S. Office Action in U.S. Appl. No. 16/557,713, dated Nov. 13, 2020, 25 pages.
U.S. Office Action in U.S. Appl. No. 17/005,640, dated Dec. 22, 2021, 26 pages.
Wikipedia.org [online], "Docker(software)," Mar. 2013, retrieved on Oct. 25, 2019, retrieved from URL <https://en.wikipedia.org/wiki/Docker_(software)>, 8 pages.
Wikipedia.org [online], "OS-level virtualization," Aug. 2006, retrieved on Oct. 25, 2019, retrieved from URL <https://en.wikipedia.org/wiki/OS-level_virtualization> , 4 pages.
Wikipedia.org [online], "System Image," Feb. 2013, retrieved Oct. 25, 2019, retrieved from URL <https://en.wikipedia.org/wiki/System_image>, 2 pages.
Wong, "What's the Difference Between Containers and Virtual Machines?," Jul. 15, 2016, Electronic Design, retrieved from URL <http://electronicdesign.com/ dev-tools /what-s-difference-between-containers-and-virtualmachines>, 3 pages.
www.en.wikipedia.org [online], "Online Analytical Processing" Mar. 2018, retrieved on Mar. 19, 2020, retrieved from URL <https://en.wikipedia.org/wiki/Online_analytical_processing>. 14 pages.
www2.microstrategy.com [online], "MicroStrategy Intelligence Server," Apr. 2019, retrieved on Oct. 25, 2019, retrieved from URL <https://www2.microstrategy.com/producthelp/10.4/ProjectDesignGuide/WebHelp/Lang_1033/Content/ProjectDesign/MicroStrategy_Intelligence_Server.htm>, 2 pages.
www2.microstrategy.com [online], "OperationsManager Guide" 2016, retrieved on Mar. 20, 2020 retrieved from URL <https://www2.microstrategy.com/producthelp/10.4/manuals/en/OperationsManager.pdf>, 154 pages.
Xu et al., "Mining Container Image Repositories for Software Configuration and Beyond," 2018 ACM/IEEE 40th International Conference on Software Engineering: New Ideas and Emerging Results—ICSE-NIER'18, May 27-Jun. 3, 2018, 4 pages.

\* cited by examiner

Workflow Library 1

| Name | Purpose | Description | Security Permissions | Compatible Versions |
|---|---|---|---|---|
| Patching (Workflow 1) | Upgrade Software and/or Fix Known Software Errors | Check SW Version; Compare SW Version with a Current SW Version; Download a Patch if No Match; and Install the Patch if No Match | Full Control; and Modify | Versions 2.09 & Higher |
| Update Cache (Workflow 2) | Store New Data and/or Remove Old Data | Open Cache; Identify Data in the Cache; and Store New Data in the Cache and/or Remove Old Data from the Cache | Full Control; Modify; and Read & Execute | Versions 1.10 & Higher |
| ... | ... | ... | ... | ... |
| Import Data Source (Workflow 5) | Import New Data from a Source into a Destination | Open Source; Identify Data to Import; Determine the Destination; and Initiate Import of Identified Data from the Source to the Destination | Full Control; Modify; Read & Execute; and Write | Versions 1.10 & Higher |

FIG. 2

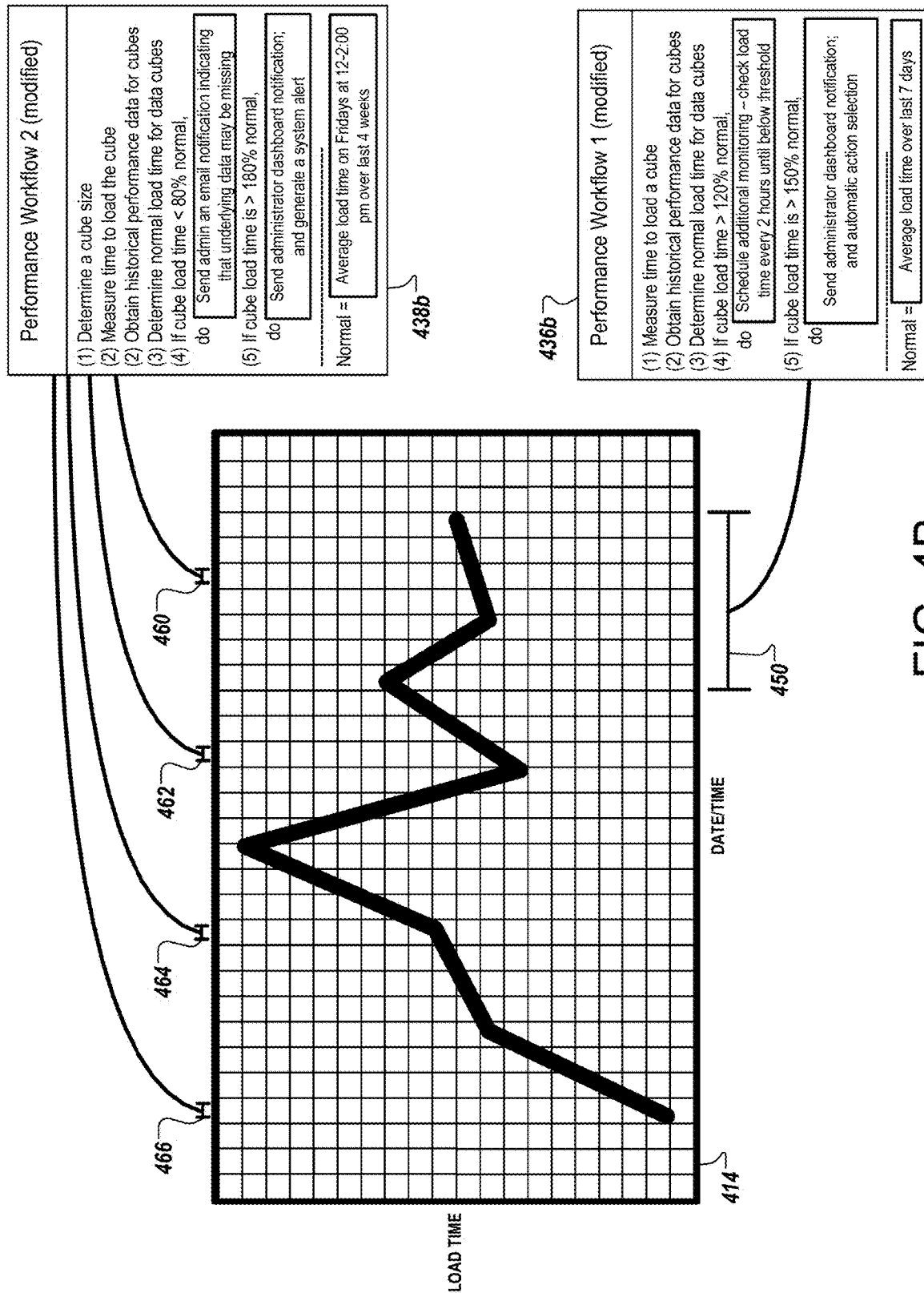

| Performance Deviation | Potential Causes | Actions to Potentially Correct |
|---|---|---|
| Poor Performance | Out-of-date Software | Update Server Software |
| | Running Service A Version 1.0 with Service B Version 1.0 | Update Server Software |
| | | Update Service A to Version 2.0 |
| | | Update Settings to Prevent Service A and B From Running at the Same Time |
| | Server reaching capacity limits | Update Server Configuration (e.g., increase cache size, allocate more RAM, etc.) |
| | Surge in server load | Update Server Configuration (e.g., increase cache size, clear cache, etc.) |
| | Hardware failure | Update Server Configuration (e.g., reallocate resources from other systems) |
| Unusually High Performance | Data missing | Recover or redownload data |
| | | Update link or reference to data |
| | Data object corruption | Reload data object |
| | | Recover or redownload data object |
| | | Reinstall Server Software |
| | | Update Server Software |
| ... | ... | ... |

FIG. 7

MONITORING PERFORMANCE DEVIATIONS

CROSS-REFERENCE TO RELATED APPLICATION

This application claims the benefit of U.S. Provisional Application No. 62/902,098, filed Sep. 18, 2019, and titled "MONITORING PERFORMANCE DEVIATIONS," which is incorporated by reference.

BACKGROUND

Servers and other computers experience a wide variety of conditions. Many computer systems require periodic or ongoing maintenance to ensure proper operation and to deal with errors and limitations.

SUMMARY

In some implementations, computing workflows can be defined to monitor performance deviations that may occur over time. A computing workflow can include operations that a computer system performs, e.g., on-demand or automatically. Workflows can be packaged in a modular, redistributable form to facilitate set up and execution or be made available on a web site/web server. Workflows may be made available from a public or cloud-computing-based source in some implementations. Workflows may be configured to monitor various aspects of performance of a computer system, such as latency, load time, capacity, throughput, accuracy, reliability, frequency of errors, and so on. Performance may be monitored at various levels. For example, performance may be determined for a system as a whole, or for actions associated with groups of applications, users, data objects, documents, data sets, functions, etc. Similarly, performance may be monitored for actions associated with individual applications, users, data objects, documents, data sets, functions, etc.

A workflow may configured to determine an expected level of performance (e.g., a reference performance level), to perform one or more operations including monitoring the performance, and to take one or more actions in response to detecting a difference between the expected level of performance and the actual level of performance detected. In particular, when performance of a specific action or aspect of a computer system deviates from an acceptable level or range, the workflow may perform actions to improve performance and/or to send notifications of the performance deviation. The workflow may be configured to perform some actions automatically, but to request and require approval from a user before carrying out other actions. For certain actions, the workflow may be configured to only notify a user. The system can provide user interfaces and other functionality to enable a user, such as an administrator of the system running the workflows, to customize workflows. Examples of customizations include (i) defining the actions for the workflow to take when performance deviations are detected; (ii) defining the conditions that trigger the detection of a performance deviation; (iii) defining expected levels of performance; and (iv) indicating the specific data objects or the types of data objects that the workflows should monitor.

In some implementations, as part of running a workflow, the system may monitor the performance of actions involving various data objects and store the performance data. The performance data may include, for example, load times, rendering times, and/or report times. In monitoring performance associated with a data object, the system may compare the performance for the object with stored performance data for previous actions involving the object or other objects in order to determine if a performance deviation has occurred. A user may define a performance deviation as a threshold difference between monitored performance and a reference performance level, such as an expected level of performance. The reference performance level and the amount of difference that results in a performance deviation event may be defined in the workflows, e.g., as customizable parameters of the workflows. The system may determine an expected level of performance using the stored performance data. A user may define the threshold difference as an amount (e.g., a percentage) of between the monitored performance and the expected level of performance. When a performance deviation is detected according to the criteria in the workflow, the workflow may be configured to perform one or more actions. These actions may include, for example, notifying a system user or administrator, suggesting changes to a server configuration, automatically adjusting a server configuration, etc. Individual workflows may specify the actions to be performed, including specifying multiple potential actions that are selectively performed based on the conditions detected, the magnitudes or types of performance deviations detected, and so on.

In some implementations, when storing performance data, the system may organize the performance data into different sections and/or subsections. For example, the system may organize the performance data by the type of data objects, e.g., data cubes, reports, dashboards, etc. The system may organize the performance data based on the type of performance observed, e.g., load times, rendering times, report times, etc. The system may organize the performance data based on the date and time when the performance data was observed and/or collected. As an example, the system may organize a portion of the performance data into a section for data cubes, and may further organize the data cube section into a subsection for load times, a subsection for rendering times, a subsection for report times, etc. The system may combine performance data of a particular type for all data objects of the same type. The system may determine an average performance for all data objects of the same type for a particular performance type, e.g., over a period of time.

In some implementations, the workflows can be accessed by a third-party server from a centralized server, such as a cloud-based server. The third-party server may be owned and managed independently of the centralized server. The centralized server may have access to a library of workflows. The centralized server may publish one or more workflows within the library of workflows. Workflows received from the centralized server may be customized for use in the third-party server. The workflows and supporting software may be structured to allow a user, such as an administrator for the third-party server, to customize the received workflows.

In some implementations, the workflows can be packaged and distributed as redistributable modules that specify a sequence of operations for a computer to perform, along with rules, conditions, and other elements that affect the manner in which the operations are performed.

In some implementations, a system provides a user, such as a system administrator, an interface to customize a workflow. For example, in customizing a workflow, an administrator may be able to specify criteria that the workflow uses to determine whether a performance deviation has occurred. Similarly, an administrator may be able to define an expected level of performance to be used as a reference performance level. For example, an administrator may be able to define an expected level of performance as an average load time for documents or objects of a specific type over a specified time period, e.g., a day, a week, a month, etc. As another example, an administrator may be able to define an expected level of performance as an average amount of time needed to render reports during specific periods of times on specific days, e.g., the past three Tuesdays between 4:00 pm and 5:00 pm. A user such may be able to customize elements of the workflow through, for example, one or more dropdown menus, one or more text fields, or a combination of dropdown menus and text fields.

In some implementations, the workflow, or the system running the workflow, will determine one or more actions to perform without requiring that the actions be predefined in the workflow. For example, the system running the workflow may refer to a lookup table or other source of information external to the workflow to determine potential causes and solutions for a detected performance deviation. The system may select one or more actions to take from the solutions provided in the lookup table. In this way, the actions of workflows can be updated or enhanced through external data sets and analysis, even when generated after the workflow is finalized. Similarly, new information about recently discovered incompatibilities or solutions can be made available to the workflows without needing to change the content of the workflows themselves. External data about actions to be performed for different performance deviations and different contexts can be generated using logs and other history data, using machine learning to analyze historical data, and/or through manual updates.

In one general aspect, a method includes: running, by the one or more computers, a workflow configured to monitor performance of an operation of the one or more computers, where running the workflow includes: determining a performance measure for the operation; determining a reference performance level for the operation; determining whether the performance measure indicates a deviation from the reference performance level for the operation; and selectively performing an action specified by the workflow based on whether the performance measure is determined to indicate a deviation from the reference performance level for the operation.

Implementations may include one or more of the following features. For example, in some implementations, the reference performance level is a predefined acceptable performance level, a previous performance level, a typical performance level, or an average performance level.

In some implementations, the performance measure is indicative of latency, response time, task completion time, transmission time, data rate, bandwidth usage, capacity, reliability, accuracy, efficiency, availability, power usage, processing speed, throughput, or level of concurrency.

In some implementations, the method includes repeatedly performing the workflow to monitor performance of multiple instances of the operation at different times.

In some implementations, the method includes periodically initiating the operation and monitoring the performance of the periodic instances of the operation.

In some implementations, the workflow is configured to monitor an operation involving a specific data object, data set, document, application, service, or user.

In some implementations, the workflow is configured to monitor an operation involving each of group of multiple data objects, data sets, documents, applications, services, or users.

In some implementations, the workflow specifies criteria for determining the reference performance level, and where the criteria set include different values for the reference performance level based on a prior performance history of the one or more computers.

In some implementations, the workflow defines the reference performance level based on one or prior instances of the operation. In these implementations, determining the reference performance level includes: accessing data includes one or more prior instances of the operation; and calculating the reference performance level based on the one or more prior instances of the operation.

In some implementations, the workflow specifies different actions to be performed in response to different magnitudes of deviations in performance from the reference performance level; and where selectively performing the action includes selecting an action to be performed based on a difference in magnitude between the performance measure and the reference performance level.

In some implementations, the workflow includes a redistributable package specifying a sequence of operations to be performed by the one or more computers.

In some implementations, the workflow specifies an action to be taken in response to detecting that the performance measure indicates performance that is higher than the reference performance level by at least a minimum amount.

In some implementations, the workflow specifies an action to be taken in response to detecting that the performance measure indicates performance that is less than the reference performance level by at least a minimum amount.

In some implementations, the reference performance level is customized for the one or more computers based on historical performance of the one or more computers.

In some implementations, the reference performance level is determined based on a previous performance of the one or more computers during a sliding window of time.

In some implementations, the operation includes: loading a document; creating a data cube; responding to a query; retrieving a file; providing data for a dashboard; or generating a report or visualization.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2 is a diagram that illustrates example interface displaying a workflow listing.

FIG. 4B is a diagram that illustrates example historical performance data to be used in monitoring performance deviations.

FIG. 7 is an example table displaying relationships between performance deviations, causes, and recommended actions.

Like reference numbers and designations in the various drawings indicate like elements.

DETAILED DESCRIPTION

Figure 1A:
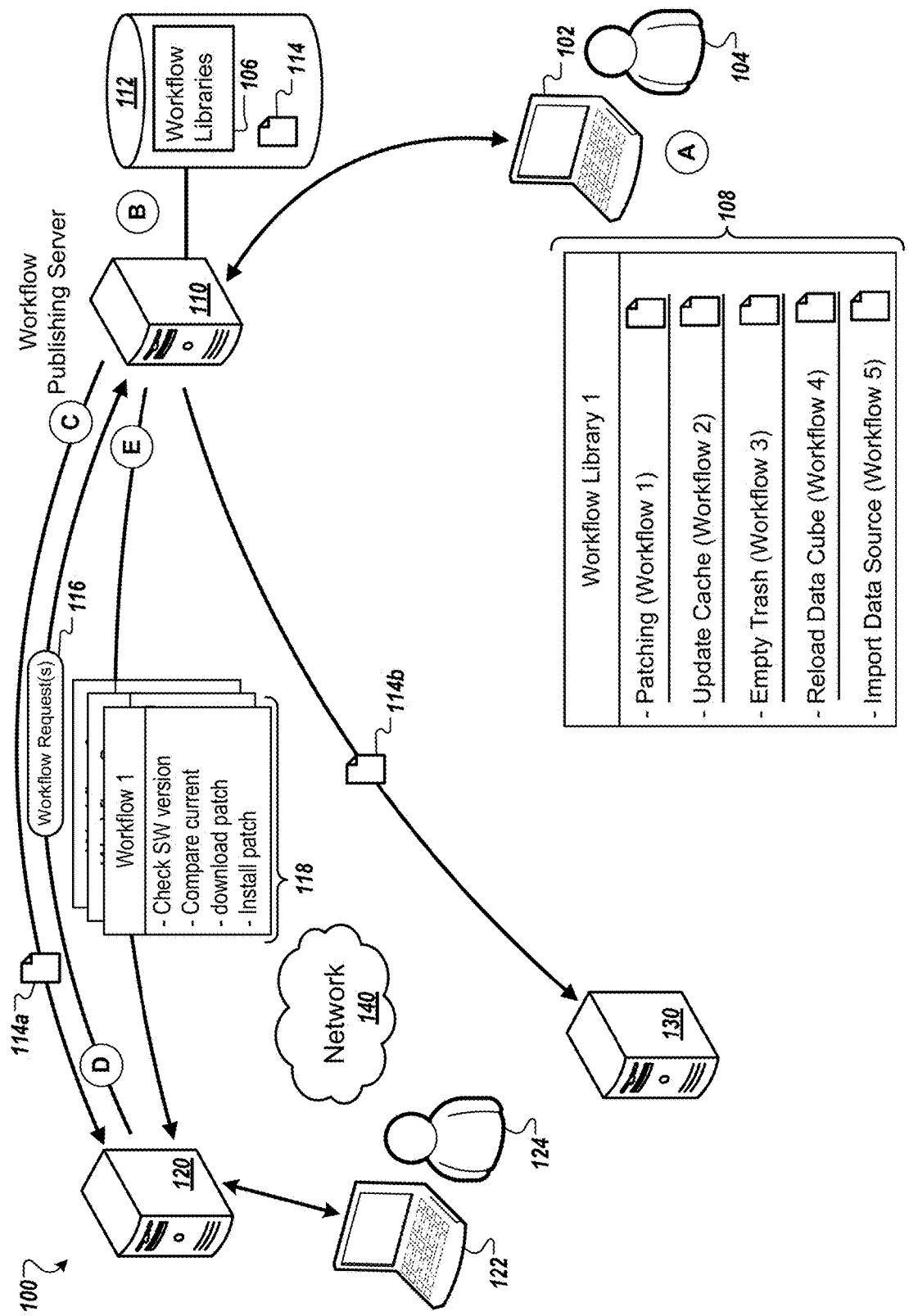
FIGS. 1A-1B are diagrams that illustrate an example system for providing workflows to remote environments.

In some implementations, a set of computing workflows can be defined to facilitate the management or operation of computer systems. A workflow publishing server is configured to distribute computing workflows to third-party servers and users of third-party servers. The workflow publishing server may send a listing of available workflows to other computer systems. The workflow publishing server may receive requests for one or more workflows indicated in the listing, and, in response, provide the requested workflows. Administrators can select from among the sets of available workflows to enable custom combinations of functionality at the systems they manage.

The workflows can be configured to allow administrators to modify the received workflows. For example, an administrator may modify workflows to better address particular problems or errors experienced by the a server, to customize how the workflows are to be implemented, to select a data source to be used by a workflow, to select a destination to be used by a workflow, to link multiple workflows so the execute together, etc.

In some implementations, the workflow publishing server workflows a remote server based on an analysis of error logs, error reports, and/or server manager logs received from the remote server. In analyzing the error logs, error reports, and/or server manager logs, the workflow publishing server may leverage one or more machine learning to identify conditions present at the remote server and to select relevant workflows.

A workflow can specify a set of computing operations to be performed, potentially along with logic to adaptively or selectively vary which operations are performed and how the operations are performed depending on conditions at a computer system. A workflow can be specified in a workflow module, which can be a data package that indicates the operations, rules, parameters, and other elements or characteristics of the workflow. The workflow module can a portable and redistributable data package that is arranged to be read and processed so a receiving computer system can implement the process or operations that it specifies. In some implementations, a workflow module can be executable or interpretable (e.g., a data package with executable or interpretable code), but this is not required. Each workflow can be specified a corresponding workflow module that specifies the operations and other elements of the workflow, and allows the workflow to be transmitted from one device or system to another device or system that receives and carries out the operations specified in the workflow module.

For example, a workflow can include instructions for a computer system to perform a sequence of actions or functions. The workflow can specify data to be acquired (e.g., to determine current settings, current performance metrics, etc.) and conditions to be evaluated, which can result in different sets of operations being performed by the computer system. Workflows can have many different uses, such as to install patches, change settings, fix causes of errors, optimize performance, resolve incompatibilities, correct dependencies, refresh caches, optimize data sets, monitor performance, and more. Frequently, a workflow is designed to cause a specific purpose or result when run. An administrator can select a workflows to be run periodically to automate maintenance, or workflows may be run on-demand.

A workflow can be packaged in a standard, lightweight form that can be interpreted or executed without being compiled. Part of a workflow can be a collection of commands to be performed, similar to a script or batch file. As discussed further below, a workflow can have various types of logic integrated into the workflow that allow the execution of the commands to be varied according to the context of the computer for which it is run. For example, a workflow may include different mutually exclusive branches representing different sets of commands, and the computer that executes the workflow can determine which branch is appropriate when the workflow is run. As another example, the workflow can include parameters (e.g., fields, variables, etc.) that are adaptively set for the particular computer running the workflow. These parameters for execution of the workflow may be edited and customized by an administrator, or may be set by the operation of the workflow based on data collected by the workflow through interaction with elements of the computer system. The commands that a workflow instructs to be performed can be commands to invoke functions of software already installed on a computer system, such as functions of an operating system, applications, tools, and so on that are already installed on the computer system. A workflow may also initiate other types of actions, such as interacting with another system using an application programming interface (API), changing settings of the computer or connected system, and so on. In some implementations, the workflow itself may include executable code to be run.

The workflow can be packaged as a module that is redistributable, and so does not need an installation process to be used. Additionally, the module can be editable so that users can tailor the operation for their respective needs. In some implementations, the workflow may designate fields that are customizable by a user. For example, the workflow can include fields for time periods to take actions, resources (e.g., files, folders, devices, etc.) that operations of the workflow act on, values for settings, and so on. Further, the workflow can be editable to add, remove, and modify operations of the workflow.

A server system may provide a configuration interface (e.g., through an application on a client device, a web page, a web application, etc.) that allows an administrator to configure the operation of the server system. The management interface can be configured to communicate with a remote management server to request and receive workflow modules, or have workflow modules and workflow lists pushed from the management server. Once a workflow is received, the configuration interface can include features to request, review, edit, activate, and deactivate workflow modules. For example, the configuration interface can enable a user to view the properties of a specific workflow module, view the operations the workflow module is configured to perform, edit those operations and/or resources the operations use or act on, and save any changes to the customized workflow module. The configuration interface can enable the user to initiate running the workflow, for example, by manually initiating execution, by setting the workflow to be run at a scheduled time (e.g., once or on a recurring schedule), or by setting the workflow to be run in response to detecting one or more conditions (e.g., to run a workflow when load exceeds a threshold, or when a particular type of error occurs, or for another condition).

Each workflow may include or otherwise be associated with a set of metadata that specifies the applicability of the workflow to different systems. For example, the metadata may indicate a type of result achieved by the workflow, a set or range of version codes for software that the workflow is compatible with, a type of error or condition that the workflow is configured to address, user permissions or security credentials needed to run the workflow, dependencies needed by the workflow, a set of applications used by the workflow, a set of settings changed by the workflow, and so on. This metadata can enable computer systems to determine the applicability of different workflows to particular systems.

In general, a server environment refers to software that provides server functionality over a network and/or a combination of hardware and software that provides server functionality. For example, a server environment may be a particular server, e.g., an on-premises server. As another example, a server environment may be a virtual machine for a server, a containerized server (e.g., made up of one or more one or more application containers), etc. Server environments can be virtualized, especially when hosted using third-party cloud computing infrastructure. A server environment may represent a single function or application (e.g., a web server, a database server, a file server, an application server, etc.) or may represent the software (e.g., modules, containers, virtual machines, etc.) for a combination of multiple functions. In a similar manner, while a computing environment or computer environment represent a single physical computer, including its hardware and software, the computing environment may be a software environment and there does not need to be a 1-to-1 mapping. For example, a cluster of computers together may provide a computing environment, and a single computer may provide multiple computing environments. As another example, a cloud computing system can host many different computing environments as virtual machines, containerized implementations, and other forms.

A computing environment or server environment can include the combination of one or more of the operating system, applications, processes, interfaces, network connections, data source connections, files and data sets, and so on, each of which may affect how the environment processes data and interacts with users and other systems. A computing environment or server environment can include the hardware resources assigned, including one or more of the processors, memory, storage devices, and other hardware. Nevertheless, given the extensive use of virtualization and cloud computing hosting, an environment typically not tied to a specific set of hardware and in many cases may be moved or replicated on different hardware (e.g., from one server to another server, from a local server to a cloud computing system, etc.).

Figure 1B:
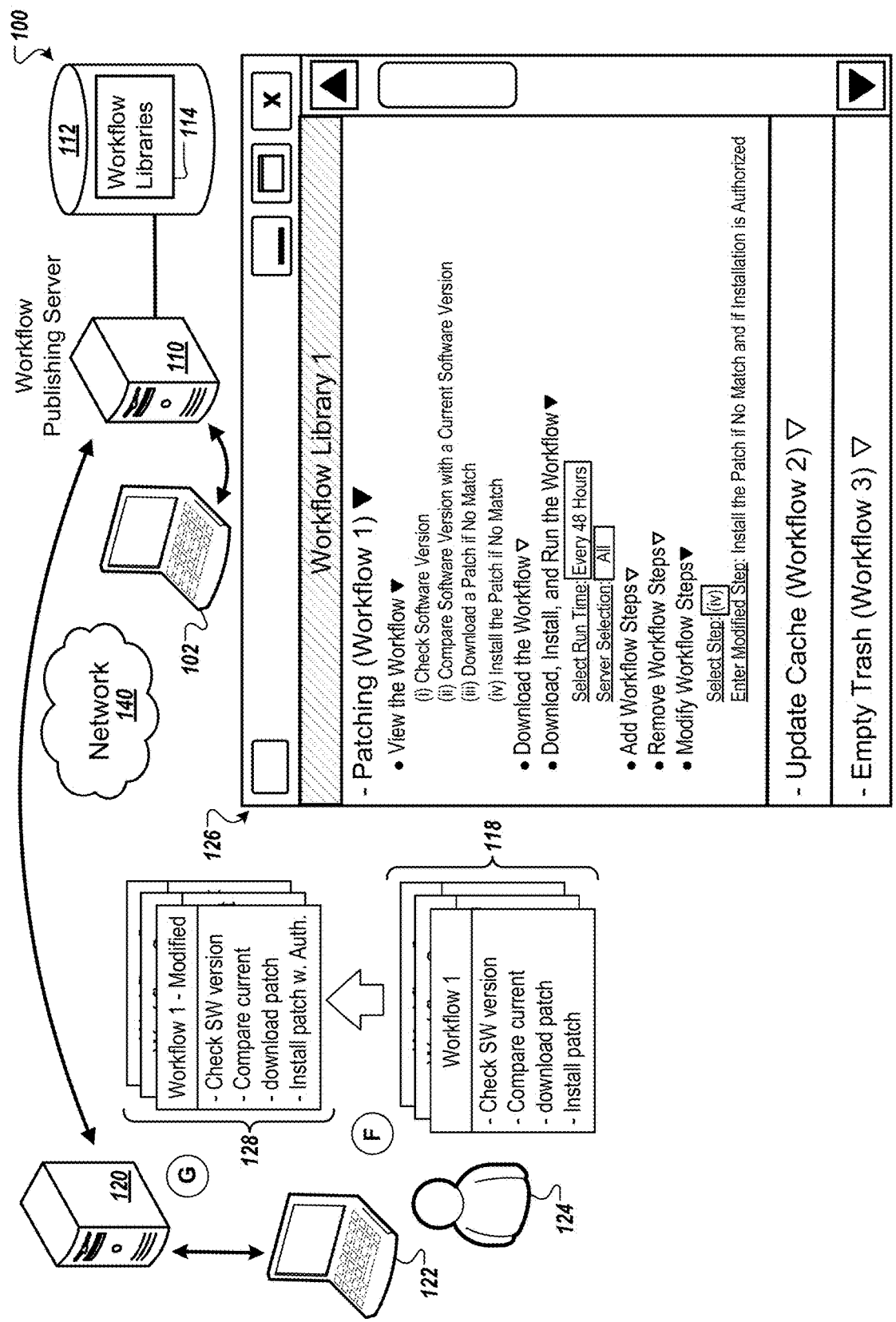

FIGS. 1A-1B are diagrams that illustrate an example system 100 for providing workflows to remote environments, such as third-party servers. The system 100 includes a workflow publishing server 110 and an administrator device 102. The system 100 is able to transmit one or more workflows to servers 120 and 130 over a network 140, so that the servers 120 and 130 can customize and run the received workflows.

The system 100 allows the workflow publishing server 110 to push one or more workflows to the third-party servers 120 and 130. The system 100 also allows one of the third-party servers 120 and 130 to pull one or more workflows from the workflow publishing server 110. The workflow publishing server 110 may provide various different systems with a listing of workflows that are available. When a system receives a workflow from the workflow publishing server 110, the workflow can be customized before it is run. In general, workflows each specify a set of operations to be performed. The workflow can designate the performance of operations to be conditional on the occurrence of particular events or conditions. A workflow may contain mutually exclusive alternatives or branching sets of operations, where one set of operations is performed instead of another set based on the conditions that are satisfied.

FIGS. 1A-1B also illustrate a flow of data, shown as stages (A) to (I), with each representing a step in an example process. Stages (A) to (I) may occur in the illustrated sequence, or in a sequence that is different from the illustrated sequence. For example, some of the stages may occur concurrently.

The administrator device 102 can be a computing device, such as a desktop computer, a laptop computer, a mobile phone, a smart phone, a personal digital assistants (PDA), a tablet computer, or other computing devices. The administrator device 102 can communicate with the workflow publishing server 110 over, for example, the network 140.

The network 140 can include public and/or private networks and can include the Internet.

The workflow publishing server 110 has associated data storage 112 storing one or more workflow libraries 106. The workflow publishing server 110 may include one or more computing devices. The workflow publishing server 110 communicates with servers 120 and 130 over the network 140. In some implementations, one or more computers of the workflow publishing server 110 may communicate with the administrator device 102 and one or more other computers may perform other tasks, such as communicating with the servers 120 and 130. The workflow publishing server 110 may communicate with the servers 120 and 130 through one or more application programming interfaces (APIs).

The servers 120 and 130 may each include one or more computing devices. The servers 120 and 130 are remote with respect to the workflow publishing server 110. The servers 120 and 130 may each be part of a cloud computing platform (e.g., Amazon Web Services (AWS), Microsoft Azure, and so on).

In the example of FIGS. 1A-1B, the workflow publishing server 110 provides workflows for the management of a computing platform that includes software run by the servers 120 and 130. For example, the platform may be a data analytics software platform that includes one or more applications or services, e.g., web server functionality, functionality to access data repositories, query response functionality, functionality to generate visualizations, and so on. The servers 120 and 130 may each run the software of the platform in independently managed systems, for example, for different companies and organizations. As a result, the servers 120 and 130 represent systems that are managed and operated independently from each other and from the workflow publishing system 110. The workflow publishing server 110 can make the workflows available so that the administrators of third-party systems, e.g., servers 120 and 130, can separately select and run the workflows to enhance the maintenance and operation of the software platform. In some implementations, the workflow publishing server 110 is operated by or is affiliated with the provider of the software platform. The workflows may be created, tested, and/or validated before being made available to other systems by the workflow publishing server 110. For example, the workflows can be trusted or certified sets of operations for maintaining or optimizing the software platform.

The techniques disclosed in this document can increase the efficiency and accuracy of server system management.

One or more workflows can be accessed, implemented, and processed in order to automate many tasks that would otherwise require significant manual input. In addition, by reducing the amount of manual input needed, server system management using the disclosed techniques is less prone to errors and/or reaction inconsistencies. The disclosed techniques further improve the efficiency and accuracy of server system management by, in some implementations, recommending specific workflows for a particular system based on of their server system and/or their determined needs. The recommended workflows may be determined based on an analysis of one or more error reports or error logs for a system. The recommended workflows may be determined based on analysis of previous actions taken, such as a log of actions that an administrator took to maintain or adjust a server. The recommended workflows may be selected by leveraging one or more machine learning. The disclosed techniques further improve the efficiency and accuracy of server system management by allowing the customization of workflows to the specific needs of a particular administrator or system.

The techniques disclosed in this document can increase the reliability of server systems. Workflow operations may be created and/or customized such that they are performed automatically when certain conditions are satisfied. These operations may include, for example, updating software, installing patches, importing new data, or removing old data that can increase and maintain the reliability of server systems. Conditions which may trigger the performance of these operations may include, for example, a determination that a software update or patch has come available, if a certain amount of time has passed since the operation was last performed, or a determination that new data has come available. Accordingly, server system reliability is improved by ensuring, for example, that the server system is using the latest software, has the latest patches installed, is using the newest available data, etc. In some implementations, the disclosed system is able to recommend one or more workflows to be implemented in a particular server system. The disclosed system may recommend workflows when it determines that the workflow may increase the reliability of the server system or increase the efficiency of the server system, e.g., through an analysis of the server system's error reports or server manager logs.

As shown in FIG. 1A, in stage (A), a workflow library 106 is created or updated. This can involve creating, modifying, testing, and/or validating workflows to be included in the workflow library 106.106 As shown, a first workflow library 106 includes five workflows: a first workflow for patching software ("Workflow 1"), a second workflow for updating a cache of a computer system ("Workflow 2"), a third workflow for emptying a trash folder of a file system ("Workflow 3"), a fourth workflow for reloading an online analytical processing (OLAP) data cube ("Workflow 4"), and a fifth workflow for importing a data source ("Workflow 5"). The administrator 104 may upload the new or modified workflow library 106 to the workflow publishing server 110 over the network 140 or over a different network Validating or testing a workflow of a workflow library may involve performing one or more of the operations within a workflow (or all operations within a workflow) on a testing environment. The testing environment may be a computer, a computing system, a server environment, a virtual machine, etc. During validation, the operation of the workflow can be tested to ensure proper results are achieved, that security is maintained, compatibility is achieved with an appropriate set of software versions or system configurations, etc.

The workflows in the workflow library 106 can be created on the device 102 or any of various other devices and uploaded to the workflow publishing server 110 for storage and distribution.

In stage (B), the workflow publishing server 110 adds the new or modified workflows to the library 106, which is stored in the data storage 112. This may involve replacing a previous version of the workflow library 106 or updating a previous version of the workflow library 106.

When the workflow publishing server 110 adds the new or modified workflow library 106 to the workflow libraries 106, it may also generate or update a workflow listing 114. The workflow listing 114 may list all workflows included in the workflow libraries 106. The workflow listing 114 may list all workflows from a particular workflow library. For example, there may be separate workflow listings for each workflow library.

The workflow listing 114 may include information about each of the workflows within the workflow listing 114 as is discussed in more detail below with respect to FIG. 2. This information may include metadata, such as a name of the workflow, a purpose of the workflow or an error that the workflow addresses, a description of the operations within the workflow (e.g., which may also include required conditions for the workflow to be performed), a list of persons who can initiate running of the workflow, security permissions for the workflow, and software versions that the workflow is compatible with.

In stage (C), the workflow publishing server 110 sends workflow listings 114a and 114b to the servers 120 and 130 respectively. The workflow listings 114a and 114b can represent a catalog of the available workflows that can be obtained from the workflow publishing server 110. In some cases, the workflow listings 114a and 114b include all workflows, and in other cases they may represent customized subsets of the total set of workflows, e.g., subsets determined to have appropriate compatibility with or relevance to the servers 120 and 130.

The workflow listings 114a and 114b may be sent by the workflow publishing server 110 to the servers 120 and 130 respectively over the network 140. Here, the workflow publishing server 110 pushes the workflow listings 114a to the server 120, and the workflow listing 114b to the server 130. The workflow publishing server 110 may push the workflow listings 114a and 114b if they have been recently updated (e.g., new workflows have been added, a workflow library which corresponds with the workflow listing has been updated or added, etc.). The workflow publishing server 110 may push these workflow listings 114a and 114b periodically. For example, the workflow publishing server 110 may have scheduled to send the server 120 a workflow listing every two days. The schedule for the server 130 may be different than the schedule of the server 120. For example, the workflow publishing server 110 may have scheduled to send the server 130 a workflow listing every week as opposed to every two days for the server 120.

In some implementations, a server, such as the server 120 or 130, requests a workflow listing from the workflow publishing server 110. The third-party server may schedule workflow listing requests so that they are sent periodically.

In some implementations, different workflow listings 114a and 114b are provided to the servers 120 and 130. For example, the servers 120 and 130 may run different versions of software or have different configurations, so that different sets of workflows are applicable to each. The workflow publishing server 112 can select a customized subset of the workflows in the workflow library 106 for each server, based on known characteristics of the servers. For example, the servers 120 and 130 can periodically provide configuration data indicating software installed, versions of the software, configuration settings, load levels, usage logs, error logs, and so on. From this information, the workflow publishing server can filter the workflow listing 114 so that each workflow listing 114*a*, 114*b* has a customized, filtered subset of the workflows.

In some implementations, the workflow listings 114*a* and 114*b* are listings of recommended workflows that the workflow publishing server 110 selects as being recommended for the servers 120 and 130. In these implementations, the workflow publishing server 110 may receive (e.g., periodically) error reports or error logs experienced by the server 120 and/or the server 130, and server manager logs from the server 120 and/or 130. The workflow publishing server 110 may analyze these error reports, error logs, and/or server manager logs, and recommend one or more workflows to the respective third-party server.

An analysis of these error reports, error logs, and/or server manager logs may be used to identify workflows that solve specific problems experienced by the respective third-party server and/or workflows that solve similar problems experienced by the respective third-party server. For example, an analysis of an error report of the server 120 may reveal that a number of errors are occurring because the software is out of date. In this example, the workflow publishing server 110 may search through the metadata of the workflows in the workflow libraries 106 to identify any workflows that are related to updating server software or patching server software, and provide the identified workflows to the server 120. A recommended workflow does not need to solve the exact same problem to be recommended because, as will be discussed in more detail below with respect to FIG. 1B, the workflow can be customized for the particular server that it is to be implemented in.

An analysis of these error reports, error logs, and/or server manager logs may reveal workflows that can increase system stability (e.g., if it is determined that one or more errors are due to a high server load, or a high degree of fluctuation in server load, etc.). An analysis of these error reports, error logs, and/or server manager logs may reveal workflows that can reduce user input (e.g., if it is determined that server managers or users are repeatedly doing tasks that could be automated by a workflow, if it is determined that the one or more errors are due to human input error, or if it is determined that the one or more errors are due to inconsistent human oversight). The workflow publishing server 110 may filter out workflows from the recommended workflows if they are incompatible with the respective third-party server, e.g., the workflow requires a different software version than what is installed on the server. The workflow publishing server 110 may provide these recommended workflows to the respective third-party servers as part or all of the workflow listings 114*a* and 114*b*.

In some implementations, the administrator 104 may select the one or more workflows to recommend to the servers 120 and 130 based on the results of analysis performed by the workflow publishing server 110 on the respective error reports, error logs, critical log files (e.g., logs for an application server, logs for an intelligence server, logs for queue producers, logs for queue consumers, etc.), core files, crash dumps, and/or server manager logs.

In some implementations, the workflow publishing server 110 leverages one or more machine learning in order to analyze the respective error reports, error logs, critical log files (e.g., logs for an application server, logs for an intelligence server, logs for queue producers, logs for queue consumers, etc.), core files, crash dumps, and/or server manager logs associated with, for example, the servers 120 and 130. In these implementations, the workflow publishing server 110 may capture other attributes and/or characteristics of the servers 120 and 130 such as, for example, the operating system (OS) used, the version of the OS used, applications or services run, versions of applications or services run, hardware characteristics, etc. These attributes and/or characteristics may be made available to and used by the one or more machine learning. In these implementations, the workflow publishing server 110 may feed the error reports, error logs, critical log files, core files, crash dumps, server manager logs monitor, attributes, and/or characteristics associated with, for example, the servers 120 and 130 to the one or more machine learning to see if the server conditions matched known defects. Using this information, the one or more machine learning may determine one or more server conditions. The one or more machine learning may represent the one or more server conditions as a pattern.

The output of the one or more machine learning may be used by the workflow publishing server 110 or the administrator 104 to select one or more workflows for recommendation. For example, if the observed server conditions/pattern matched a previously known defect, the one or more machine learning may recommend a known workflow associated with those conditions. If the observed server conditions/pattern did not match a known defect, then an analysis would be done for these new conditions/new pattern, and a new workflow may be generated to address these new conditions/new pattern. The analysis may be performed by a user of the workflow publishing server 110. The new workflow may be generated by a user of the workflow publishing server 110. The analysis may be performed automatically by the workflow publishing server 110 through, for example, trial and error and/or leveraging one or more machine learning to determine which workflows are likely work based on, for example, what workflows are associated with conditions similar to the observed conditions, what workflows have a high rate of success, etc. For example, the workflow publishing server 110 may attempt to use existing workflows to see if any have a beneficial effect on the server conditions. The workflow publishing server 110 may test the existing workflows in the order of which are determined to have the highest likelihood of success based on, for example, leveraging the one or more machine learning. If one or more workflows are determined to have a beneficial effect on the observed server conditions (e.g., less defects, less severe defects, better performance, etc.), the workflow publishing server 110 may associate those one or more workflows with the observed conditions/pattern, e.g. associate those one or more workflows with the specific defect detected.

The one or more machine learning may include one or more machine learning models. The one or more machine learning models may include an unsupervised learning model.

The workflow listing 114*a* may be the same or different from the workflow listing 114. The workflow listing 114 may be modified for the server 120 in order to generate the workflow listing 114*a*. For example, the workflow listing 114*a* may contain the workflows found in the workflow listing 114 that are compatible with the software of server 120. Similarly, the workflow listing 114b may be the same or different from the workflow listing 114. The workflow listing 114 may be modified for the server 130 in order to generate the workflow listing 114b. For example, the workflow listing 114b may contain the workflows found in the workflow listing 114 that are compatible with the software of server 130.

In stage (D), after having received the workflow listing 114a, a user 124 of the client device 122 may select one or more workflows from the workflow listing 114a for download from the workflow publishing server 110. In selecting one or more workflows from the workflow listing 114a, one or more workflow requests 116 are generated by the server 120 and sent to the workflow publishing server 110. The one or more workflow requests 116 may contain a name or other indication of the one or more selected workflows, and/or a name or other indication of the source of the one or more workflows, such as a name or other indication of the one or more workflow libraries that correspond with the one or more selected workflows.

The one or more workflow requests 116 may contain additional information, such as information about the server 120. This additional information may contain, for example, the software version(s) used by the third-party server, error logs or reports related to the third-party server, server manager logs, storage capacity of the third-party server, remaining storage space of the third-party server, performance information related to all or part of the third-party server (e.g., bandwidth, load experienced, amount of memory, number of processors, type of processors, etc.), The one or more workflow requests 116 may be sent to the workflow publishing server 110 over the network 140.

In some implementations, the one or more workflow requests 116 do not specifically name or identify one or more workflows. In these implementations, the workflow requests 116 may contain a query for workflows for the workflow publishing server 110. The query may include information naming or describing a specific error, condition, or other issue experienced by the server 120. The workflow publishing server 110 may access the workflow libraries 106 through the data storage 112, and compare the query information to the metadata for each of the workflows. In comparing the query information to the workflow metadata, the workflow publishing server 110 may identify one or more workflows that specifically address the error, condition, or other issue experienced by the server 120, and/or one or more workflows that are related to the error, condition, or other issue experienced by the server 120. The workflow publishing server 110 may leverage one or more machine learning in identifying the one or more workflows.

In stage (E), in response to receiving the one or more workflow requests 116, the workflow publishing server 110 sends the requested workflows 118 (or a subset of the requested workflows) to the server 120. The workflow publishing server 110 may first analyze the received one or more workflow requests 116 to determine which workflows are being requested. The workflow publishing server 110 may access the data storage 112 to obtain the requested workflows 118 in preparation of sending the requested workflows 118 to the server 120. Here, the user 124 had requested three workflows: including Workflow 1, Workflow 2, and Workflow 3. These three workflows make up the requested workflows 118 and are sent to the server 120. In addition to sending the workflows, the workflow publishing server 110 may provide instructions for installing and running each of the workflows in the requested workflows 118.

In the example, a workflow module can be used to transmit workflows. A workflow module can be a data package that defines a particular workflow, e.g., Workflow 1 for patching. The workflow module may be a data package or one or more files (e.g., script files) that provides instructions for a set of operations to be performed. For example, the workflow module 118a may include instructions for the client device 122 (and/or the server 120) to perform a set of operations related to patching. Specifically, the workflow module may include, for example, instructions for the client device 122 to (i) check the software version (e.g., current software version and/or required software version), (ii) compare the current software version with the required software version, (iii) download a patch for the required software version, and (iv) install the patch for the required software version. The workflow module can be arranged and formatted so that the client device 112 or another device receiving the workflow module can automatically perform some or all of the operations of the specified workflow upon receiving and processing the workflow module.

The workflow module may optionally be executable. That is, the workflow module 118 may include an executable file (e.g., compiled software code) that can be executed by the client device 122 (and/or the server 120). Alternatively, the workflow module may be a data package containing multiple executable files that can be executed by the client device 122 (and/or the server 120). This is only one of many options for specifying a workflow, many of which do not involve or require executable code. In fact, for cross-platform support, it may be advantageous in many implementations to specify instructions in a form that is not compiled for a specific operating system or architecture, but nevertheless indicates operations to perform.

Similarly, the workflow module may be interpretable. That is, the workflow module may include instructions that are not compiled but nevertheless can be performed by the client device 122 (and/or the server 120) after receiving the workflow module.

In some implementations, the workflow publishing server 110 removes one or more workflows from the requested workflows 118 due to a determination that one or more workflows are incompatible with the server 120. This subset of the requested workflows 118 may be sent to the server 120 in place of the requested workflows 118. In these implementations, a notification may be provided to the server 120 indicating that one or more workflows were not sent due to incompatibility.

In some implementations, the workflow publishing server 110 pushes one or more workflows to the server 120 or the server 130 without the need for any workflow requests, such as the one or more workflow requests 116. In these implementations, the workflow publishing server 110 may push recommended workflows in response to analysis of a third-party server's error reports, error logs, and/or server manager logs. The workflow publishing server 110 or the administrator 104 may identify which workflows to recommend in accordance with the methods described above with respect to stage (C).

As shown in FIG. 1B, in stage (F), the user 124, through an interface 126 of the client device 122, inspects the requested workflows 118 and generates a set of modified workflows 128 from the requested workflows 118. Here, the user 124 has selected Workflow 1 in the interface 126, allowing the user 124 to inspect Workflow 1 and modify it. The user 124 has selected the option to "View the Workflow," revealing the operations contained within Workflow 1. These operations include a first operation to check the software version of the server, a second operation to compare the software version with a current software version, a third operation to download a software patch if the checked software version does not match the current software patch, and a fourth operation to install the software patch if the checked software version does not match the current software patch. Other options that the user 124 has not selected include an option to download the workflow, an option to add workflow steps (e.g., add additional operations to Workflow 1 that may or may not be conditional, or add alternative operations to the workflow), and an option to remove workflow steps (e.g., remove an operation from Workflow 1).

An option that the user 124 has selected is an option to download, install, and run the workflow. By selecting this option, the user 124 is presented a field to select or enter a run time, and a field to select or enter the specific servers or server environments that Workflow 1 should be installed on or otherwise implemented in. In the run time field, the user 124 has selected to run Workflow 1 every 48 hours. The user 124 may have been able to select or enter other options, such as every 12 hours, every 24 hours, every week, every month, every year, once—immediately, once—with a delay (e.g., a delay of 1 hour, 2 hours, 12 hours, 1 day, 1 week, etc.), etc. In the server or server environment field, the user 124 has selected or entered "all." Accordingly, the user 124 has chosen for Workflow 1 to be installed and run on all of server 120's servers and/or server environments, or on all of server 120's compatible servers and/or server environments.

An option the user 124 has selected is an option to modify workflow steps. By selecting this option, the user 124 is presented a field to select or enter a step, e.g., an operation, to modify and a field to enter the modification(s). Here, the user 124 has selected or entered the fourth operation, the operation to install the software patch if the checked software version does not match the current software patch. The user 124 has modified the fourth operation so that it now includes an additional condition that the installation of the patch must also be authorized by a server manager or admin.

The user 124 may be able to modify the workflows in other ways. For example, the user 124 may be able to select from a list of recommended or frequently used operations. This list may be presented to the user 124 on the interface 126. When the user selects an operation from the list, the operation may replace a currently selected operation or may be added to the operations of the corresponding workflow. The user 124 may be able to drag one or more operations from the list into the workflow. The user 124 may be able to rearrange operations in the workflow by, for example, dragging them into different positions. The user 124 may be able to modify a workflow by entering code that is then added to the computer code corresponding with the workflow, e.g., in order to add one or more new operations to the workflow, add one or more conditions to the workflow or to individual operations in the workflow, etc. The user 124 may be able to modify a workflow by modifying the computer code corresponding with the workflow, e.g., in order to modify existing operations or conditions, remove existing operations or conditions, etc.

The operations of the workflow may be conditional on one or more events being satisfied. These conditions may be temporal conditions, e.g., a date, an elapse of a certain amount of time, etc. These conditions may be satisfied through a triggering event, e.g., the occurrence of an error or a particular error, an instruction or action by a server manager or administrator, a state of the server system, a server load threshold being met, etc. These conditions may be satisfied through the successful performance of one or more higher order operations in the set of operations, e.g., operations that are to be performed before the operation at issue. These conditions may be predetermined. These conditions may be set by the user 124 through the interface 126.

Similarly, the workflow itself may be conditional on one more events being satisfied before it is processed. These conditions may be temporal conditions, e.g., a date, an elapse of a certain amount of time, etc. These conditions may be satisfied through a triggering event, e.g., the occurrence of an error or a particular error, an instruction or action by a server manager or administrator, a state of the server, a server load threshold being met, etc. These conditions may be satisfied through the successful performance of an operation of another workflow or of the successful processing of another workflow. These conditions may be predetermined. These conditions may be set by the user 124 through the interface 126. These conditions may include the occurrence of an event, the nonoccurrence of an event, particular data being identified, particular data not being identified, particular data being matched, particular data not being matched, the time of day, the day of the week, the time of year, a status of a server, the load on a server reaching a threshold level, the security permissions of a user, etc.

The workflows may each contain branching or alternative operations. For example, Workflow 1 may contain a set of alternative operations where a match is found between the checked software version and the current software version. In this example, Workflow 1's alternative operations may include an operation to schedule a check for updates one week from now, an operation to generate a notification indicating that the server is currently running the most up-to-date software, and an operation to generate a notification indicating the scheduled software check if the software check is successfully scheduled. As demonstrated in the example, the branch or path of operations that is performed during the processing of a workflow, such as during the processing of Workflow 1, may depend on the particular conditions satisfied and/or on the successful performance of a higher order operation.

By modifying (e.g., customizing) the requested workflows 118 for the server 120, or for particular servers or server environments within or part of the server 120, the user 124 generates the set of modified workflows 128. In some implementations, the modified workflows 128 are generated in response to the user saving or submitting their modifications to the requested workflows 118.

The user 124 may be able to modify the requested workflows 118 in other ways. For example, the user 124 may be able to select a source to be used by a particular workflow, such as a data source. For example, the user 124 may be able to select a destination to be used by a particular workflow. For example, the user 124 may be able to string multiple workflows together. For example the user 124 may be able to select a script to be used by or with a particular workflow.

At stage (G), the user 124 implements the modified workflows 128 into the server 120. Implementing the modified workflows 128 in the server 120 may involve installing the modified workflows on the server 120, on one or more particular servers part of the server 120, or one or more particular server environments within or part of the server 120. Implementing the modified workflows 128 in the server 120 may involve running (e.g., processing) the modified workflows 128, scheduling one or more times to run each of the modified workflows 128, or setting one or more other conditions (e.g., triggering events) for each of the modified workflows 128 that when satisfied result in running the modified workflows 128. Implementing the modified workflows 128 in the server 120 may involve stringing a workflow from the modified workflows 128 to another workflow, such that the processing of one of the strung workflows is a precondition to the processing of the other strung workflow.

FIG. 2 is a diagram that illustrates example interface 202 displaying the workflow listing 114a as previously shown in FIG. 1a in more detail. As previously mentioned, the workflow listing 114a may contain metadata for each of the workflows within the listing. The metadata may include a name of the workflow, a purpose of the workflow or an error that the workflow addresses, a description of the operations within the workflow (e.g., which may also include required conditions for operation performance), a list of persons who can access the workflow, security permissions for the workflow, and software versions that the workflow is compatible with.

As shown, the workflow listing 114a includes a first row 204 for Workflow 1, a second row 206 for Workflow 2, and a final row 208 for Workflow 5. The workflow listing 114a also includes a column 210 for the names of each of the workflows, a column 212 for the purpose or error to be addressed by each of the workflows, a column 214 for the descriptions and/or required conditions of each of the workflows, a column 216 for the security permissions required for each of the workflows, and a column 218 for the compatible software versions for each of the workflows.

As shown, different workflows may require different security permissions. For example, as shown in column 216 of row 204, Workflow 1 requires a higher security permission of "Full Control" or "Modify" in order to install and/or process Workflow 1, whereas, as shown in column 216 or row 208, Workflow 5 allows many more security permissions to install and/or process Workflow 5. The reason why Workflow 1 may require higher security permissions than Workflow 5 may be due to the operations within each of the workflows. The operations of Workflow 1, as can be seen in column 214 of row 204, involve downloading and installing software which may be viewed as high risk operations (or high risk when compared with the operations of Workflow 5). The operations of Workflow 5, as can be seen in column 214 of row 208, involve identifying and importing data, which may be viewed as low or medium risk operations (or low or medium risk when compared with the operations of Workflow 1).

Figure 3:
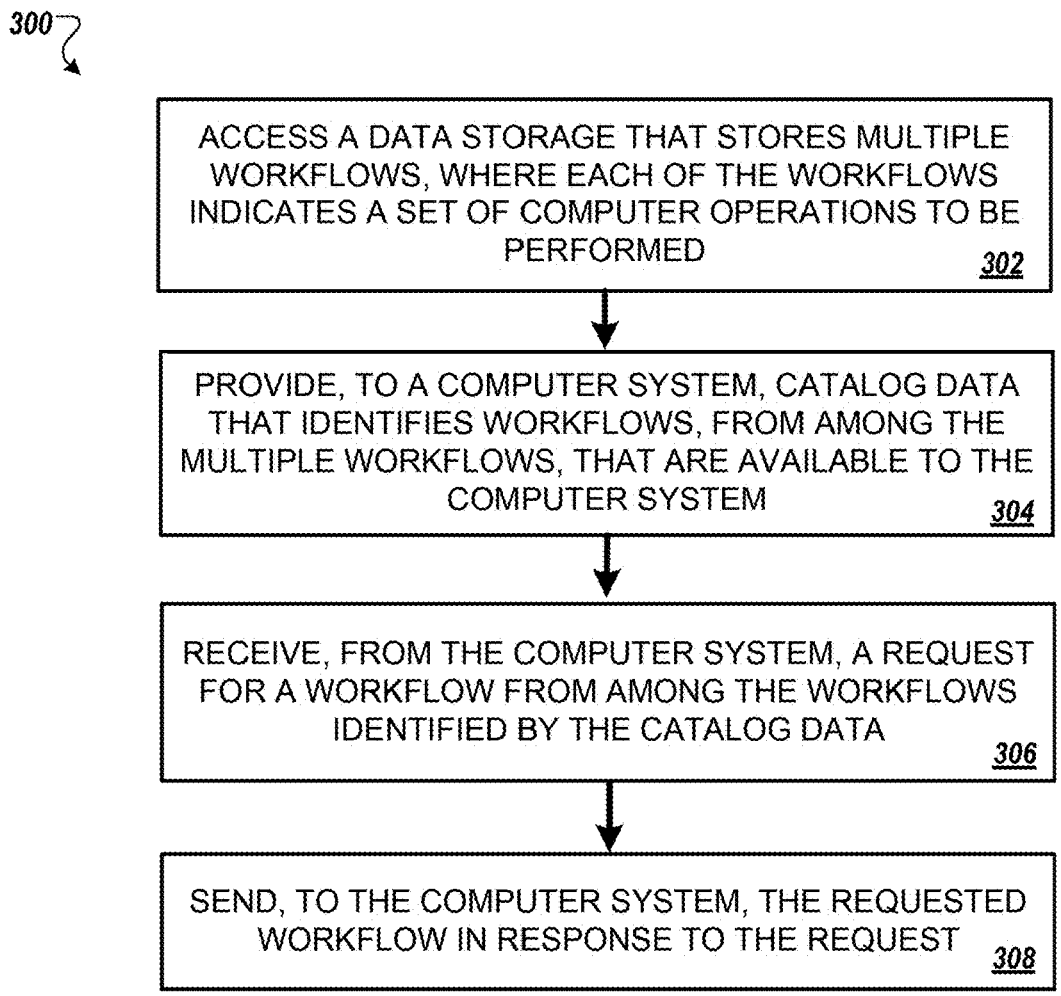
FIG. 3 is an example process for providing workflows to remote environments.

FIG. 3 is an example process 300 for transmitting workflows to remote environments. The process 300 can be performed, at least in part, using the system 100 described herein. For example, the process 300 can be performed using the workflow publishing server 110 shown in in FIG. 1.

The process 300 includes accessing data storage storing multiple workflows, where each of the workflows indicates a set of computer operations to be performed (302). The computer operations may include downloading software, checking for software updates, updating software, installing software, running software, importing data, exporting data, checking for new or different data, running a script, generating data, generating a notification, sending a notification, etc. The computer operations may be conditional on the satisfaction of one or more requirements. These requirements may include the performance of another operation, the processing of a workflow, a time having elapsed, a triggering event, etc. The data storage may be on-site.

Thee data storage can store metadata associated with the workflows. The metadata for a particular workflow may include information such as a name of the workflow, a purpose of the workflow or an error that the workflow addresses, a description of the operations within the workflow, a list of persons who can access the workflow, security permissions for the workflow, and/or software versions that the workflow is compatible with.

A workflow can indicate a sequence of multiple operations that are to be performed in a predetermined order. Examples of operations include checking a software version of a server, checking the most recent software version, comparing software versions, downloading software, uploading software, identifying data, uploading data, storing data, downloading data, deleting or clearing data, comparing data, determining destinations, and/or determining sources. As an example, a workflow may include an operation to check the version of software currently used by a particular server, to check the most recent version of the software, and to compare the currently used version with the most recent version. In this example, the operations may need to be performed in a predetermined order. For example, the workflow may need to first check the version of software currently used by the server, then check the most recent version of the software once the first check is performed, and, only after both checks are performed, compare the currently used version with the most recent version. The predetermined order may be set when the one or more workflows are initially created, e.g., by the administrator 104. The predetermined order may modified at a third party server, e.g., by the user 124 of the client device 122 or by a different user of a different client device. The predetermined order may be set at a third party server, e.g., by the user 124 of the client device 122 or by a different user of a different client device.

A workflow may include multiple conditional operations that are designated to be performed when corresponding conditions are satisfied. Examples of conditions include the occurrence of an event, the nonoccurrence of an event, particular data being identified, particular data not being identified, particular data being matched, particular data not being matched, the time of day, the day of the week, the time of year, a status of a server, the load on a server, the security permissions of a user, etc.

In some cases, a workflow includes a chain of conditional operations. The chain of conditional operations may include a first operation and a first condition and a second operation and a second condition. Performance of the first operation may be dependent on the first condition being satisfied, and performance of the second operation may be dependent on the second condition and the first condition being satisfied. As an example, when either the first condition or the second condition is not satisfied, the server running the workflow may automatically abort the workflow and/or may automatically restart the workflow, e.g. after a predetermined amount of time. Similarly, when both the first condition and the second condition are not satisfied, the server running the workflow may automatically abort the workflow and/or may automatically restart the workflow, e.g. after a predetermined amount of time. As an example, when the first condition is satisfied but the second condition is not satisfied, the server running the workflow may wait a predetermined amount of time before automatically aborting the workflow or automatically restarting the workflow. During this predetermined amount of time, the server and/or the workflow may check to see if the second condition is satisfied.

A workflow may contain an operation to check a software version used by the server, compare the employed software version with the most recent version of the software, download the most recent software version if the employed version does not match the most recent version, and install the most recent software version if the employed version does not match the most recent version and if the most recent version downloaded successfully. In this example, the first condition may be whether the employed version of the software matches the most recent version of the software. In this example, the second condition may be whether the most recent software version downloaded successfully. A chain of conditional operations may also include additional operations and conditions.

In some cases, one or more workflows specify multiple alternative sequences of operations to be performed based on conditions present when the one or more workflows are processed. The multiple alternative sequences may be mutually exclusive. The computer or server that executes the workflow can determine which sequence of operations is appropriate when the workflow is run. The conditions for determining a sequence of operations to follow may be the same as the conditions for conditional operations. For example, these conditions may include the occurrence of an event, the nonoccurrence of an event, particular data being identified, particular data not being identified, particular data being matched, particular data not being matched, the time of day, the day of the week, the time of year, a status of a server, the load on a server reaching a threshold level, the security permissions of a user, etc. As an example, a workflow may have two alternative sequences of operations, a first sequence to be performed on weekdays and a second sequence to be performed on weekends. When the computer or server runs the workflow, the computer or server may make a determination as to whether it is a weekday or a weekend. If the computer or server determines that it is a weekday, the computer or server will provide for the first sequence of operations in the workflow to be run. Alternatively, if the computer or server determines that it is a weekend, the computer or server will provide for the second sequence of operations in the workflow to be run.

In some cases, one or more workflows specify operations that involve executing one or more scripts or executables. As an example, executables may include programs and certain files, e.g., files that are .BAT, .COM, .EXE, .BIN, .DMG, and/or .APP files. As an example, a script may include a series of commands within a file that is capable of being executed without being compiled. The scripts may include Python scripts, PHP scripts, JavaScript scripts, etc.

In some cases, one or more workflows specify operations that include shutting down or restarting a server environment. The operations may include a restart operation. The operations may include a shutdown operation. As an example, the operations for shutting down or restarting a server environment may be for shutting down or restarting one or more particular computers of the server environment.

In some cases, one or more workflows specify operations that involve accessing data from a data repository or data indicating operational characteristics of a data repository. As an example, a data repository may include a server, e.g. an on-premises server or a third-party server, or part of a server. As an example, a data repository may include a database. As an example, a data repository may include cloud storage that is provided by a cloud-computing platform. As an example, operational characteristics of the data repository may include log data for accesses to the data repository, a status of the data repository (e.g., an indication of whether or not it is experiencing an error or has recently experienced an error), a number of requests for data within the data repository, performance characteristics (e.g., an average time to process requests for data within with data repository, a maximum time, etc.), an indication of the specific data requested from the data repository, an indication of data added to the data repository, one or more dates and times associated with a request for data, one or more dates and times associated with data added to the data repository, etc.

In some cases, one or more workflows represent a template of operations to be customized for a particular server environment. For example, a workflow may include one or more fields that can be filed, customized, or modified. In this example, the one or more fields may be empty and may need to be filled in, e.g., by the user 124 using the user device 122. In this example, the one or more fields may have default values that are automatically set, e.g., by the workflow publishing server 110, or by are set by a user, e.g., the administrator 104 through the administrator device 102. As another example, one or more fields may be added to the workflow to, for example, add additional operations, further define operations, add conditions to operations, etc. The fields may correspond with an operation, with a condition for a conditional operation, with a condition for a particular sequence of operations, with multiple operations, etc. The fields may allow a user to, for example, specify a run time for the workflow, specify one or more server environment on which to run the workflow, add one or more operations, modify one or more existing operations, remove one or more existing operations, rearrange an order of the operations, set an order of the operations, set a hierarchy of the operations, divide the operations into multiple sequences of operations, assign one or more operations to a specific sequence of operations, remove one or more operations from a sequence of operations, etc.

In some cases, one or more workflows address specific errors or conditions of server environments, and have metadata indicating the errors or conditions they address. As an example, the specific errors or conditions may include the cache allocated to a server environment being full or approaching capacity (e.g., 70% full, 80% full, 90% full, etc.), poor performance of the server environment (e.g., unacceptable load times, render times, reporting times, etc.), a server environment crash, the amount of load on the server environment, hardware failure, etc. As an example, the metadata indicating the errors or conditions may include a purpose of the one or more workflows, an error that the one or more workflows address, a description of the operations within the one or more workflows. In addition, metadata such as security permissions may also provide some indication of the errors or conditions that the one or more workflows address.

The process 300 includes providing, to a computer system, catalog data identifying workflows, from among the multiple workflows, that are available to the computer system (304). The catalog data may include or be a workflow listing, e.g. workflow listings 114a or 114b as shown in FIG. 1. The catalog data may identify a set of workflows. The catalog data may contain one or more workflow libraries, e.g. workflow library 106 as shown in FIG. 1). The catalog data may be a workflow library. The catalog data may contain metadata that corresponds to one or more workflows. The metadata may include a name of the one or more workflows, a purpose of the one or more workflows or an error that the one or more workflows address, a description of the operations within the one or more workflows (e.g., which may also include required conditions for operation performance), a list of persons who can access the one or more workflows, security permissions for the one or more workflows, and software versions that the one or more workflows are compatible with. In some implementations, the identified workflows are those workflows that are compatible with the computer system. The computer system may be a server, a group of servers, a server system, or a server environment (e.g., the server 120 as shown in FIGS. 1A-1B). The computer system may be part of a cloud-computing service or environment.

In some cases, providing the catalog data includes publishing the catalog data to multiple systems. As an example, the multiple systems may include one or more server systems, server environments, computer systems, etc. For example, the multiple systems may include the server 120 and the server 130 shown in FIG. 1. As an example, the catalog data may be published over a public or private network such as the Internet.

In some cases, providing the catalog data includes pushing the catalog data to one or more systems. For example, the catalog data may be pushed by the workflow publishing server 110 shown in FIG. 1. As an example, the one or more systems may include one or more server systems, server environments, computer systems, etc. In this example, the one or more computer systems may include or be part of one or more server systems or server environments. For example, the one or more systems may include the server 120 and/or the server 130 shown in FIG. 1.

In some cases, the catalog data includes metadata associated with each of the workflows. The metadata may indicate software the associated workflow applies to, conditions the associated workflow applies to, permissions needed for the associated workflow, a description for the associated workflow, and/or an error addressed by the associated workflow. As an example, conditions that a workflow applies to or errors addressed by the workflow may include conditions or errors experienced by a server system or environment running the workflow. In this example, the conditions may include the cache allocated to a server environment being full or approaching capacity (e.g., 70% full, 80% full, 90% full, etc.), poor performance of the server system or environment (e.g., unacceptable load times, render times, reporting times, etc.), a server system or environment crash, the amount of load on the server system or environment, hardware failure, etc. As an example, the permissions needed for the associated workflow may include security permissions. In this example, security permissions may include a full control permission, a modify permission, a read and execute permission, a write permission, etc. As an example, a user of the server system or server environment may be assigned one or more permissions, e.g. by an administrator of the server system or server environment.

The metadata of the workflows may be used by the computer system in performing actions or in preventing actions from being performed. For example, the metadata associated with a workflow may be used by the computer system to prevent some users from running the workflow on the computer system if they do not have the requisite permission level as indicated by the metadata. As another example, the metadata indicating a software associated with a workflow may be used by the computer system to prevent the workflow from being run if the workflow is no longer compatible with the computer system, e.g. where the software on the computer system has been updated or upgraded since the workflow was downloaded from the workflow publishing server 110 shown in FIG. 1. Similarly, a user of the computer system may use the metadata indicating the software to ensure that the workflow is compatible. A user of the computer system may adjust or modify the metadata of a workflow. For example, a user may change the conditions, permissions, description, and/or error addressed of a particular workflow.

The process 300 includes receiving, from the computer system, a request for a workflow from among the workflows identified by the catalog data (306). The request may specifically name or otherwise identify one or more workflows from the workflows identified by the catalog data. In some implementations, the request does not specifically name or specifically identify one or more workflows. In these implementations, the request may contain a query. The query may include information naming or describing a specific error, condition, or other issue experienced by the computer system. The query information may be compared to metadata corresponding to the multiple workflows. In comparing the query information to the workflow metadata, the system (e.g., the system 100 as shown in FIGS. 1A-1B) or a part of the system (e.g., the workflow publishing server 110 as shown in FIGS. 1A-1B) may identify one or more workflows of the multiple workflows that specifically address the error, condition, or other issue experienced by the computer system, and/or one or more workflows that are related to the error, condition, or other issue experienced by the computer system. The system (e.g., the system 100 as shown in FIGS. 1A-1B) or a part of the system (e.g., the workflow publishing server 110 as shown in FIGS. 1A-1B) may leverage one or more machine learning in identifying the one or more workflows of the multiple workflows.

The process 300 includes sending, to the computer system, the requested workflow in response to the request (step 308). The requested workflow may be sent to the computer system over a network. The system (e.g., the system 100 as shown in FIGS. 1A-1B) or a part of the system (e.g., the workflow publishing server 110 as shown in FIGS. 1A-1B) may check to confirm that the workflow requested is compatible with the computer system before sending.

The process 300 optionally includes receiving a request for catalog data. In these cases, providing the catalog data includes providing the catalog data in response to receiving the request for catalog data. For example, the catalog data may be provided by the workflow publishing server 110 shown in FIG. 1 to the server 120 in response to a request for the catalog data being sent by the server 120 to the workflow publishing server 110. The request for the catalog data and the catalog data may be sent over a public or private network such as the internet.

The process 300 optionally includes identifying a configuration of the computer system, and providing a customized subset of the workflows based on the configuration of the computer system. As an example, the configuration of the computer system may include one or more characteristics of the computer system. As an example, the configuration of the computer system may indicate software installed on the computer system, versions of the software installed, configuration settings of the computer system, load levels experienced by the computer system, usage logs of the computer system, error logs of the computer system, and so on. As an example, in providing a customized subset of workflows, the workflow publishing server 110 shown in FIG. 1 can filter the workflows to identify those that are compatible with the configuration of the computer system, or are compatible with one or more characteristics of the configuration of the computer system.

In some cases, providing a customized subset of the identified workflows is based on a software version for software used by the computer system, a setting of the computer system, a usage pattern of the computer system, an error encountered by the computer system, and/or a limitation encountered by the computer system. For example, each workflow that is compatible with a first version of a particular software, e.g. version 2.1, may be placed in the subset, e.g. by the workflow publishing server 110 shown in FIG. 1. In this example, the first version of the software may be the version used by the computer system, e.g. a server, requesting the workflows.

As an example, settings may include configuration settings. In this example, all workflows that are compatible with the configuration settings may be placed in the subset. The configuration settings may correspond with the computer system. The configuration settings may include, for example, a cache size of the computer system, memory allocated to the computer system, processors allocated to the computer system, bandwidth of the computer system, software used by computer system, software versions used by the computer system, etc.

As an example, usage patterns may include operation patterns associated with users of the computer system. The usage patterns may be determined by the workflow publishing server 110 shown in FIG. 1 by, for example, leveraging one or more machine learning. The usage patterns may indicate, for example, operations frequently performed by users of the computer system, operations that are frequently performed together, operations that typically follow an earlier operation, operations are typically performed during a particular state of the computer system (e.g., particular date, particular time of the day, particular load level on the computer system or threshold load level being reached, etc.), etc.

As an example, errors encountered by the computer system may include the cache allocated to computer system being full or approaching capacity (e.g., 70% full, 80% full, 90% full, etc.), poor performance of the computer system (e.g., unacceptable load times, render times, reporting times, etc.), the computer system experiencing a crash, the amount of load on the computer system reaching a threshold level, hardware failure, etc. In determining whether the computer system has encountered an error, as an example, the workflow publishing server 110 may analyze error reports, error logs, and/or server manager logs of the computer system in order to identify errors encountered by the computer system. In analyzing error reports, error logs, and/or server manager logs, the workflow publishing server 110 may, for example, leverage one or more machine learning.

The process 300 optionally includes receiving information, from the computer system, indicating a log of actions performed by the computer system, determining a level of similarity of actions in the log with operations in a workflow of the multiple workflows, determining that the level of similarity satisfies a threshold; and providing, to the computer system, the workflow or a recommendation for the workflow based on determining that the level of similarity satisfies the threshold. As an example, the information may include usage logs or server manager logs. As an example, determining a level of similarity may include determining whether a first operation performed by the computer system is found in a workflow, determining whether one or more operations performed by the computer system before or after performing the first operation are also found in the workflow, determining whether the workflow includes any operations that are not performed by the computer system, determining whether the workflow does not include any operations that are performed by the computer system, determining whether the workflow does not include any operations within a subset of operations performed by the computer system (e.g., those operations surrounding the first operations, a group of operations that are frequently performed together on the computer system, etc.), determining if the conditions for an operation performed by the computer system are the same or similar to the conditions for performing a corresponding operation found in a workflow, etc. In determining a level of similarity, as an example, the workflow publishing server 110 shown in FIG. 1 may leverage one or more machine learning. The threshold may be set by a user. The threshold may be set to, for example, 60%, 70%, 80%, or 90% similarity.

The process 300 optionally includes receiving data, from the computer system, indicating errors or conditions of a server system, identifying one or more workflows of the multiple workflows that are configured to address the errors or conditions, and providing, to the computer system, the workflow or a recommendation for the workflow. As an example, the data may include usage logs, error reports, error logs, and/or server manager logs. In identifying one or more workflows, as an example, the workflow publishing server 110 may leverage one or more machine learning.

The process 300 optionally includes receiving a query from the computer system, determining a workflow of the multiple workflows based on the query, and providing, to the computer system, the workflow or a recommendation for the workflow in response to receiving the query. As an example, a query may be or include a request for a catalog of available workflows, a request for one or more identified workflows, a request for compatible or recommended workflows, etc. The query may include, for example, an indication of one or more specific workflows. The query may include, for example, one or more criteria for workflows that are to be used in identifying one or more workflows to be sent to the computer system in response. The query may include information corresponding with the computer system such as, for example, configuration settings of the computer system. In some cases, the query may be include a request for documents, e.g. from the workflow publishing server 110 shown in FIG. 1. In these cases, the workflow publishing server 110 may identify one or more workflows that correspond with the requested documents, and may send the identified one or more workflows to the computer system or may send a recommendation including an indication of the identified workflows to the computer system.

A computer system enables users such as administrators of a computing environment to customize workflows to be performed automatically by one or more computers. The system enable users to customize workflows by, for example, (i) defining the actions for the workflow to take when performance deviations are detected; (ii) defining the conditions that trigger the detection of a performance deviation; (iii) defining expected levels of performance (e.g., reference performance levels); and/or (iv) indicating the specific data objects or the types of data objects that the workflows should monitor. The workflow may be configured to perform some operations and actions automatically, but to request and require approval from a user before carrying out other operations.

Figure 4A:
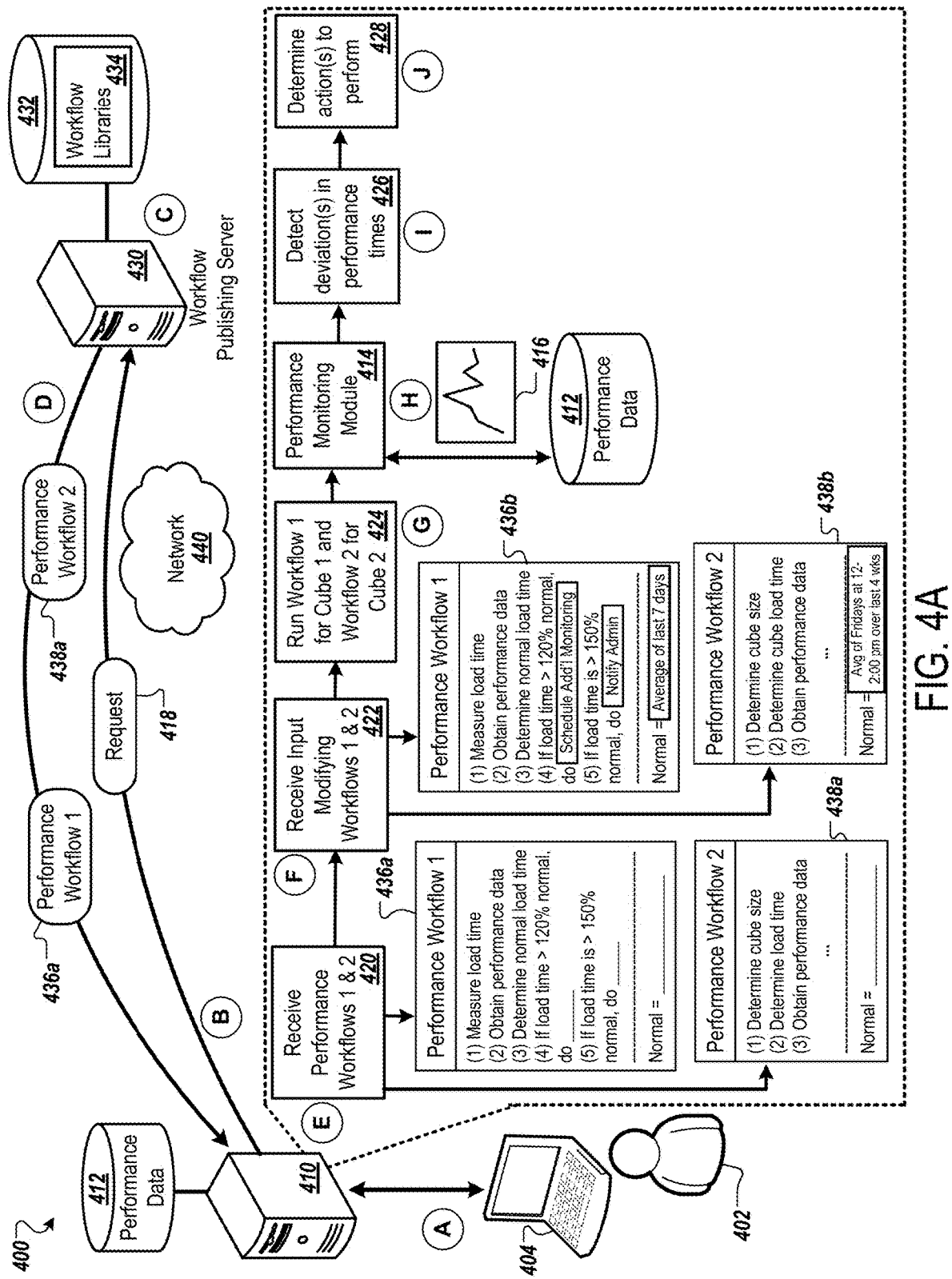
FIG. 4A is a diagram that illustrates an example system for monitoring performance deviations.

FIG. 4A depicts a diagram that illustrates an example system 400 for performance deviation monitoring. The system includes a server 410 having data storage 412, a workflow publishing server 430 having data storage 432. The server 410 is configured to receive workflows 436a and 438a from the workflow publishing server 430 over a network 440. A user 402 of the server 410 may customize the received workflows 436a and 438a using a user device 404. The workflows 436a and 438a may be run in the server 410 in order to monitor the performance of various data objects. The workflows 436a and 438a, when run, may detect performance deviations and perform one or more actions based on the detect deviation.

FIG. 4A also illustrates a flow of data, shown as stages (A) to (J), with each representing a step in an example process. Stages (A) to (J) may occur in the illustrated sequence, or in a sequence that is different from the illustrated sequence. For example, some of the stages may occur concurrently.

A user device 404 can be a computing device, such as a desktop computer, a laptop computer, a mobile phone, a smart phone, a personal digital assistants (PDA), a tablet computer, or other computing devices. The user device 404 can communicate with the server 402 over, for example, the network 440. The network 440 can include public and/or private networks and can include the Internet.

The server 410 may include one or more computing devices. The server 410 is remote with respect to the workflow publishing server 410. Accordingly, the server 410 may be considered a third-party server. The server 410 may be part of a cloud computing platform (e.g., Amazon Web Services (AWS), Microsoft Azure, and so on). The server 410 may include a performance monitoring module 414.

The data storage 412 stores historical performance data. The data storage 412 may include memory, such as non-volatile memory.

The workflow publishing server 430 may contain one or more computing devices. The workflow publishing server 430 communicates with the server 410 over the network 440. The workflow publishing server 430 may communicate with the server 410 through an application programming interfaces (API). The workflow publishing server 430 may communicate with servers other than the server 410. The workflow publishing server 430 may be configured to receive requests from the server 410 and from additional servers. The workflow publishing server 430 may be configured to provide workflows in response to requests from remote servers.

The data storage 432 stores workflow libraries 434. The workflow libraries 434 include the first performance workflow 436a ("Performance Workflow 2") and the second performance workflow 438a ("Performance Workflow 2"). The data storage 432 may include memory, such as non-volatile memory.

The server 410 may include one or more computing devices. The server 410 is remote with respect to the workflow publishing server 410. Accordingly, the server 410 may be considered a third-party server. The server 410 may be part of a cloud computing platform (e.g., Amazon Web Services (AWS), Microsoft Azure, and so on).

In general, a workflow refers to a series of computer operations. A workflow can be performed by a server system or a server environment. A workflow can be customized for a particular server or a particular server environment. A workflow can be modified by one or more system administrators. Performance of one or more operations in the set of workflow operations may be conditional on the earlier performance of a workflow operation. Performance of one or more operations in the set of workflow operations may be conditional on user interaction, user operation, and/or user input. Performance of one or more operations in the set of workflow operations may be conditional on the occurrence of particular events such as, for example, a state of a server environment, performance of the server environment, the services or software running on a server environment, the load on a server environment, the configuration of a server environment, etc. A workflow may contain alternative or branching sets of operations, where one set of operations is performed over another set based on the conditions that were satisfied.

Performance of a workflow may be initiated by a user. Alternatively, performance of a workflow may be initiated by the detection of certain conditions.

In some implementations, a workflow may be run in the background. In these implementations, the workflow may always be running. In these implementations, the workflow may be workflow for monitoring or may contain operations for monitoring. Monitoring may include monitoring for particular conditions occurring at a server, a server environment, remote computing systems, etc.

The techniques disclosed in this document allow for developing, modifying, and running workflows to better detect performance deviations for a specific server system. By allowing users such as system administrators to customize a workflow by, for example, defining the conditions that trigger the detection of a performance deviation and by defining a reference performance level (e.g., such as an expected level of performance), workflows can be created that are tailored to a specific server system. By tailoring the performance monitoring to the specific server system, results of performance monitoring more accurately indicate issues with the system or data and can account for the unique configuration of the server system or for the specific data used in the server system. For example, performance deviations can be defined in a workflow in such a way that, on average, they are more likely to indicate the actual presence of missing data, data corruption, improper server configuration, etc.

The techniques disclosed in this document can increase the efficiency and reliability of server systems. By tailoring the performance monitoring to the specific server system, results of performance monitoring can more accurately indicate issues with the server system or with the data used in the server system. For example, performance deviations can be defined in a workflow in such a way that, on average, they are more likely to indicate the actual presence of missing data, data corruption, improper server configuration, etc. Accordingly, the efficiency and reliability of server systems can be increased as issues with a server system or with the data can be more accurately and quickly identified.

The techniques disclosed in this document further increase the efficiency and reliability of server systems. Due to the large number of data objects in a server system and the large number of times that operations are performed with such data objects, numerous performance deviations occur on a frequent basis. Accordingly, requiring a user or users to analyze the performance data or to manually perform operations in response to a detected performance deviation is a demanding task. Users, such as administrators, can develop or modify a workflow to take specific actions when a performance deviation is detected. Additionally, the workflow, or the system running the workflow, may refer to a lookup tablet to automatically select one or more actions to take. These actions may include, for example, notifying a user, suggesting changes to a server configuration, automatically adjusting a server configuration, etc. Accordingly, the techniques disclosed improve efficiency by, for example, introducing fully or partially automated actions and/or operations that would normally be performed manually. The techniques disclosed also improve reliability by, for example, notifying users as soon as performance deviation is detected.

A user such as an administrator can view, modify, and/or deploy one or more workflows. For example, an administrator may perform these actions using a workflow management dashboard interface displayed by an administrator device. Examples of administrator devices include a computing device such as a laptop computer, a desktop computer, a mobile phone, a smart phone, a tablet, a PDA, etc. Through an interface of the administrator device, the administrator may be able to view the management dashboard. Within the management dashboard, the administrator may be able to view a listing of one or more workflows. As an example, the listing of one or more workflows may be a listing of all workflows currently available to the particular system (e.g., server system). As an example, the listing of one or more workflows may be listing of workflows currently available to the particular system and available for download from a remote system. As an example, there may be a first listing of one or more workflows of workflows currently available to the particular system and a second listing of one or more workflows available for download from a remote system. As an example, the listing of one or more workflows may be workflows associated with a particular server or server environment. In this example, the administrator may specify the particular server or server environment (e.g., through a drop-down menu or a field). As an example, the listing of one or more workflows may be workflows that have been previously been modified by the administrator or by a different user. As an example, the listing of one or more workflows may be workflows associated with a particular type of data, e.g., data cubes, reports, dashboards, etc.

The management dashboard may also provide the administrator access to notifications, an internal inbox or messaging service, a status of one or more servers or server environments, usage data of one or more servers or server environments, current or historical performance data of one or more servers or server environments, etc.

When a user such as an administrator selects a particular workflow, they may be presented an interface to view, modify, and/or deploy the particular workflow. For example, the administrator may be able to select a particular workflow from the listing of workflows within the management dashboard.

As shown in FIG. 4A, in stage (A), the process for performance deviation monitoring starts with the user 402 sending instructions to the server 410 to request one or more workflows. The instructions may indicate that a request 418 should be sent to the workflow publishing server 430. The instructions may indicate the workflows 436a and 438a should be retrieved from the workflow publishing server 430. The user 404 may generate and send these instructions through the user device 404.

In stage (B), the server 410 sends the request 418 to the workflow publishing server 430. The request 418 may be sent in accordance with the instructions received by the server 410 from the user 402 in stage (A). The request 418 may indicate specific workflows that are being requested, e.g., workflows 436a and 438a, may indicate a specific workflow library, may indicate a type of performance monitoring to be performed by the workflow, e.g., a workflow for monitoring load times, may indicate a type of data that is to be monitored by the workflow, e.g., a workflow for monitoring data cubes, and/or may include an indication of additional criteria, e.g., a requirement that the workflow is able to detect two or more different performance deviations. For example, the request 418 may specifically identify the workflows 436a and 438a. As another example, the request 418 may indicate that a workflow is being requested in order to monitor the load times of data cubes. Some workflows may function with various types of performance data. For example, a workflow may be configured to obtain and analyze load times, rendering times, reporting times, etc. Accordingly, it may not be necessary for the request 418 to indicate a type of performance monitoring. Some workflows may function with various data objects. For example, a workflow may be configured to monitor the performance of data cubes, reports, dashboards, etc. Accordingly, it may not be necessary for the request 418 to indicate a type of data.

In some implementations, the request 418 includes system information of the server 410 and/or an indication of the configuration settings used by the server 410. For example, the request 418 may include an indication of the configuration settings used by the server 410, e.g., the cache size, the bandwidth, RAM allocation, CPU allocation, etc. As another example, the request 418 may include an indication of the software and/or software version that is being run on the server 410.

In stage (C), the workflow publishing server 430 analyzes the request 418 and retrieves one or more workflows from the data storage 432 based on the request. In analyzing the request 418, the workflow publishing server 430 may identify specific workflows requested, may identify a library of the workflow libraries 434 in which to search for workflows or in which specified workflows may be found, may identify a type of performance monitoring that may be used as criteria by the workflow publishing server 430 in searching for one or more workflows, may identify a type of data that may be used as criteria by the workflow publishing server 430 in searching for one or more workflows, and/or may provide additional criteria such as a description of a workflow sought. Where one or more specific workflows are identified, the workflow publishing server 430 may search through the workflow libraries 434 using a name or another identification associated with the one or more identified workflows. Where one or more libraries are identified, the workflow publishing server 430 may locate the one or more identified libraries and, for example, search the one or more identified libraries for workflows within the workflow libraries 434 or may retrieve all workflows within the one or more identified libraries.

In searching for workflows included in the workflow libraries 434, the workflow publishing server 430 may use any workflow identifications and/or other criteria provided in the request 418. For example, the workflow publishing server 430 may compare the criteria provided in the request 418 with metadata associated with the workflows found in the workflow libraries 434. The metadata associated with a workflow may include, for example, a name of the workflow, another identification of a workflow such an identification number, one or more types of performance monitoring that can be performed by the workflow, one or more types of compatible data objects that can be monitored by the workflow, and/or additional description of the workflow.

In some implementations, in searching through the workflow libraries 434, the workflow publishing server 430 may use system information and/or configuration settings corresponding to the server 410. For example, the workflow publishing sever 430 may remove workflows in the workflow libraries 434 from consideration if they are not compatible with the software used by the server 410, the software version used by the server 410, and/or the configuration settings of the server 410. The workflow publishing server 430 may determine system information and/or configuration settings corresponding to the server 410 from the request 418.

In searching through the workflow libraries 434, the workflow publishing server 430 may identify one or more workflows. Upon identifying these one or more workflows, the workflow publishing server 430 may retrieve these one or more workflows from the workflow libraries 434 in the data storage 432. Here, the workflow publishing server 430 identifies the first performance workflow 436a and the second performance workflow 438a in the workflow libraries 434, for example, using the contents of the request 418. The workflow publishing server 430 proceeds to retrieve the first performance workflow 436a and the second performance workflow 438a from the workflow libraries 434 in the data storage 432.

In stage (D), the workflow publishing server 430 transmits the identified and/or retrieved workflows to the server 410. The identified and/or retrieved workflows may be transmitted from the publishing server 430 to the server 410 over the network 440. As shown, the identified and/or retrieved workflows include the first performance workflow 436a and the second performance workflow 438a.

In stage (E), the server 410 receives one or more workflows from the workflow publishing server 430 (420). The one or more received workflows may correspond with the request 418. As shown, the received workflows include the first performance workflow 436a and the second performance workflow 438a. As shown, the workflows 436a and 438a may each include empty fields that require input from the user 402 of the server 410 or from another user to fill. The empty fields may correspond with operations or actions for the workflows 436a and 438a to perform, conditions in order to perform operations or actions, definitions for an expected level of performance, a type of data object that should be monitored, a type of performance monitoring, and/or a location where performance data can be found, where performance data can be stored, where data objects can be found, etc. One or more fields and/or steps of the workflow 436a and 438a may correspond with different performance deviations or different classifications of performance deviations, e.g., low performance, severe low performance, high performance, unusually high performance, etc.

In the example of FIG. 4A, the workflow 436a includes an empty field for an action in step 4 of the workflow. This empty field of step 4 corresponds with an action that the workflow 436a is to take when the step 4 condition is met. The step 4 condition provides that the load time of a data object must be greater than 120% the normal load time, e.g., for the type of data object that the data object belongs to. Step 4 may correlate with the detection of a first performance deviation such that a first performance deviation is detected if the step 4 condition is met. This first performance deviation may indicate a moderate low performance deviation. This first performance deviation may be indicative of a possible (e.g., greater than 30% likelihood, greater than 40% likelihood, greater than 50% likelihood, etc. determined using, for example, statistical analysis) system or data error/issue, e.g., the server 410 using out-of-date software, problematic configuration settings used by the server 410, etc.

The workflow 436a also includes an empty field for an action in step 5 of the workflow. This empty field of step 5 corresponds with an action that the workflow 436a is to take when the step 5 condition is met. The step 5 condition provides that the load time of a data object must be greater than 150% the normal load time, e.g., for the type of data object that the data object belongs to. Step 5 may correlate with the detection of a second performance deviation such that a second performance deviation is detected if the step 5 condition is met. This second performance deviation may indicate a severe low performance deviation. This second performance deviation may be indicative of a likely (e.g., greater than 70% likelihood, greater than 80% likelihood, greater than 90% likelihood, etc. determined using, for example, statistical analysis) system or data error/issue.

The workflow 436a includes an empty field for "normal" which corresponds with an expected level of performance to be used as the reference performance level. The normal or baseline level of performance may be, for example, an acceptable level of performance, a typical level of performance, a previous performance level, an average performance level (e.g., over a period of time, such as a sliding window of the last day, the last 7 days, etc.), and so on. The expected level of performance may be manually set by a user or automatically determined by a computing system, such as by evaluating an equation or function as part of running the workflow. This expected level of performance may correspond with particular type of performance monitoring, e.g., an expected level of performance for load time, for rendering time, for reporting time, etc. This expected level of performance may correspond with particular type of data object, e.g., an expected level of performance associated with data cubes, reports, dashboards, etc.

The workflow 438a also includes an empty field for "normal" which corresponds with an expected level of performance be used as the reference performance level. This expected level of performance may correspond with particular type of performance monitoring, e.g., an expected level of performance for load time, for rendering time, for reporting time, etc. This expected level of performance may correspond with particular type of data object, e.g., an expected level of performance associated with data cubes, reports, dashboards, etc.

The workflows 436a and 438a may contain additional fields. These additional fields may include a field for a type of data that is to be monitored. These additional fields may include a field for a type of performance monitoring. These additional fields may include one or more location fields that can receive a reference, link, or address to where performance data for one or more data objects can be located, to where historical performance data can be located, to where one or more data objects are located, to where performance data for one or more data objects can be stored, etc. These additional fields may include one or more additional "normal" fields for additional expected levels of performance. For example, a first normal field may correspond with an expected level of performance for load times, where a second normal field may correspond with an expected level of performance for rendering times.

In some cases, the workflows 436a and 438a may include editable fields that include default entries or values. As an example, a field defining a normal load time may contain a default entry providing for an average load time over the past day, the past week, the past month, etc. As another example, a field defining an action to take in response to a detected performance deviation may contain a default entry providing that a notification should be sent to an administrator.

In some cases, when the workflows 436a and 438a are received at the server 410, they are displayed to the user 402. The workflows 436a and 438a may be displayed to a user 402 on an interface of the user device 404. In displaying the workflows 436a and 438a to the user 402, the user device 404 may display the workflows 436a and 438a in a manner that is the same or similar to that shown. For example, the interface of the user device 404 may include a name or title of the workflow, a list of steps of the workflow, a list of empty and/or editable fields of the workflow, and/or a section for an expected or baseline level of performance.

In some implementations, the workflow publishing server 430 may push one or more workflows to the server 410 without the need for the request 418. For example, when the server 410 has previously requested and received a first version of a workflow, the workflow publishing server 430 may automatically send a second version of the workflow to the server 410 when it comes available.

In some implementations, the workflow publishing server 430 may automatically send a recommendation to the server 410 without the need for the request 418. The recommendation may identify one or more workflows that the workflow publishing server 430 recommends for the server 410. For example, when the server 410 has previously requested and received a first version of a workflow, the workflow publishing server 430 may send the server 410 a recommendation to download a second version of the workflow when it comes available.

In stage (F), the server 410 receives input from the user 402 customizing the received workflows (422). The input from the user 402 may be used to fill in or update various fields in the workflows 436a and 438a. The input from the user 402 may define operations or actions for the workflows 436a and 438a to perform, conditions in order to perform operations or actions, an expected level of performance, a type of data object that should be monitored, a type of performance monitoring, and/or a location where performance data can be found, where performance data can be stored, where data objects can be found, etc.

As shown, the workflows 436a and 438a are modified by the user 402's input, resulting in the workflows 436b and 436b. For step 4 of the first performance workflow 436b, the user 402 has provided a first action to take in response to the detection of a first performance deviation. This first action is to schedule additional monitoring of the monitored data object associated with the first performance deviation. For step 5 of the first performance workflow 436b, the user 402 has provided a second action to take in response to the detection of a second performance deviation. The second action is to notify an administrator of the server 410 that a performance deviation has occurred. Such a notification may be sent by email, or messaging methods or platforms, e.g., SMS text, email, dashboard notification, etc. Such a notification may contain an indication of the monitored data object associated with the performance deviation, a time and/or date when the performance deviation was detected, a time and/or date when the performance deviation occurred, the condition used to trigger the performance deviation, e.g., if the load time of the data object is greater than 150% of the normal load time, and/or the expected level of performance, e.g., the normal load time.

The user 402 has also provided two distinct definitions for defining an expected level of performance. For the first performance workflow 436b, the user 402 has defined an expected level of performance as the average performance, e.g., average load time, over the last week. For the second performance workflow 438b, the user 402 has defined an expected level of performance as the average performance, e.g., average load time, on Fridays between 12:00 pm and 2:00 pm over the last four weeks.

In some implementations, the user 402 may indicate that server 410 should automatically select an entry for a field and/or automatically determine an action to take. For example, as will be discussed in more detail below with respect to FIG. 7, the server 410 may refer to a lookup table to determine one or more actions to take in response to detecting a performance deviation.

In stage (G), the server 410 runs the customized workflows (424). The server 410 may run the customized workflows in response to a command by the user 402 to run the customized workflows. The server 410 may also receive an indication of one or more data objects that the customized workflows may be performed with. This indication may be provided by the user 402. Here, the customized workflows include the workflows 436b and 438b. As an example, the user 402 may issue a command to run the first performance workflow 436b for a first listing of data cubes containing a first data cube ("Cube 1") such that the performance of the first data cube will be monitored and/or analyzed in accordance with the first performance workflow 436b. As another example, the user 402 may issue a second command to run the second performance workflow 438b for a second listing of data cubes containing a second data cube ("Cube 2") such that the performance of the second data cube will be monitored and/or analyzed in accordance with the second performance workflow 438b. In these example, the first listing of data cubes may be the same as the second listing of data cubes such that the workflows 436b and 438b monitor and/or analyze the performance of the same data objects.

The server 410 may also or alternatively receive a location where one or more data objects can be found. This location may be provided by the user 402. This location may be a reference, an address, a link, etc. The location may correspond with a location on the server 410. The location may correspond with a location on the data storage 412. The location may correspond with a type of data such that all data objects at the location are of a specific data type, e.g., a location corresponds with a location for data cubes. As an example, the user 402 may issue a command to run the first performance workflow 436b with all data objects found at a specified location in the server 410 or in the data storage 412 such that the performance of all data objects at that location will be monitored and/or analyzed in accordance with the first performance workflow 436b.

In running the workflows 436b and 438b, the server 410 may perform, e.g., through the workflows 436b and 438b, one or more steps of the workflows 436b and 438b. For example, when the workflows 436b is first run, the workflow 436b may start by measuring the load time for Cube 1, e.g., the operation associated with step 1 of the workflow 436b. As another example, when the workflow 438b is first run, the workflow 438b may start by determining the cube size of Cube 2, e.g., the operation associated with step 1 of the workflow 438b. As will be discussed in more detail below, the workflows 436b and 438b may use the performance monitoring module 414 to perform one or more of the operations in the workflows 436b and 438b. For example, the workflow 436b may use the workflow monitoring module 414 to measure a load time of Cube 1. One or more operations of the workflows 436b and 438b may continue to be performed. For example, after step 1 of the workflow 438b is performed or, in some implementations, concurrently with step 1 of the workflow 438b, the workflow 438b may determine the load time of Cube 2, e.g., step 2 of the workflow 438b.

In stage (H), the server 410 obtains historical performance data 416 in accordance with the customized workflows. For example, the workflows 436b and 438b both include a step calling for performance data to be obtained, e.g., step 2 of the workflow 436b and step 3 of the workflow 438b. In obtaining historical performance data, the server 410 may use the performance monitoring module 414. The performance monitoring module 414 may access historical performance data 416 stored in the data storage 412. The historical performance data 416 accessed may correlate with a particular type of data object, e.g., data cubes, reports, dashboards, etc. The historical performance data 416 may correlate with a particular type of performance monitoring, e.g., load times, rendering times, reporting times, etc. The historical performance data 416 may correlate with a particular type of data object and a particular type of performance monitoring, e.g., load times for data cubes, rendering times for reports, reporting times for dashboards, etc. The performance data within the historical performance data 416 may be organized by dates and times such that, for example, each performance data point may be associated with a date and time when the data point was measured. The performance data for various data objects may be combined, e.g., by the performance monitoring module 414, in order to form the historical performance data 416. For example, the performance monitoring module may combine the load time data associated with all data cubes in order to produce the historical performance data 416. In this example, the performance data within the historical performance data 416 may be organized by a date and time. In this example, the performance monitoring module 414 may calculate an average load time for data cubes over time, e.g., over the past month, over the past week, etc.

The workflows 436b and 438b may use the performance monitoring module 414 to perform one or more workflow steps. For example, the first performance workflow 436b may use the performance monitoring module to perform step 1. That is, the first performance workflow 436b may use the performance monitoring module to measure a load time, for example, of Cube 1. The workflows 436b and 438b may use the performance monitoring module 414 to calculate an expected level of performance. For example, the first performance workflow 436b may use the performance monitoring module 414 to calculate a normal load time, e.g., average load time over the past week, using the historical performance data 416. As another example, the second performance workflow 438b may use the performance monitoring module 414 to calculate a normal load time, e.g., an average load time on Fridays between 12:00 pm and 2:00 pm over the last four weeks, using the historical performance data 416

As will be discussed in more detail with respect to FIG. 5, the performance monitoring module 414 evaluates the performance of various data objects, and stores performance data in a data storage 412. For a given data object, e.g., Cube 1, the performance monitoring module 414 may measure and/or calculate the performance, such as a load time, associated with the data object. For a given data object, the performance monitoring module may locate and obtain, or receive stored performance data associated with the data object such as recorded times. The performance monitoring module 414 may use the performance data associated with the data object to calculate current performance metrics. These current performance metrics may include a response time, a task completion time (which may, in some instances, be equivalent to the response time), an individual action time (e.g., time to load an item or part of an item, time to render an item or part of an item, time to scroll through an item, time to filter an item, etc.).

As an example, the performance monitoring module 414 may compare a time at which a request is sent from a browser for a particular data object with a time at which the data object was received by the browser in order to calculate a first response time for the request. The performance monitoring module 414 may compare the time at which the request was sent from the browser with a response time, e.g., a time at which the data object was received, in order to calculate a load time for the data object. The performance monitoring module 414 may compare the time at which the request was sent from the browser with a time at which the data object was rendered in order to calculate a rendering time or report time for the data object.

The performance monitoring module 414 may analyze the calculated performance metrics. The performance monitoring module 414 may issue an error or a warning based on one or more of the performance metrics. An error or warning may occur if a performance metric is unusually high, unusually low, or cannot be calculated.

In stage (I), the customized workflows detect one or more deviations in performance of the monitored data objects (426). The customized workflows may use the performance monitoring module 414 to detect one or more deviations in performance of the monitored data objects. Here, the customized workflows are the workflows 436b and 438b.

In detecting one or more deviations in performance monitoring time, the workflows 436b and 438b may establish their own respective reference performance levels representing an expected or baseline level of performance, e.g., a normal load time for data cubes, associated with a type of data object and/or a type of performance. This reference performance level is typically variable and determined by the workflow based on the monitored performance and history of the system on which the workflow runs. For example, rather than being statically defined, the reference performance level may be dynamically determined based on one or more recent operations or measurements for the particular server environment or computer that the workflow is monitoring. For example, the workflow may cause a moving average of the current server environment to be calculated that indicates the average load time of a particular resource or type of resource over the last 7 days or as measured each hour for the previous three hours. The moving average can be used as the reference performance level, and will change from time to time. This changing of the reference level over time to reflect recent conditions can be desirable to allow the workflow to measure sudden or abrupt changes corresponding to major or unusual events, rather than small or gradual performance changes over time. In general, reference performance levels, such as previous performance levels for the server environment, can be determined from monitored operations caused by the workflow, can be determined by the workflow from logs or other records (which may describe actions not caused by the workflow, such as user-initiated actions), or performance measures and reference performance levels can be obtained from other sources (e.g., such as an operating system or other performance monitoring functionality).

The workflows 436b and 438b may use the performance monitoring module 414 to establish a respective expected or baseline level of performance. The expected or baseline level of performance may be used as a threshold or may be used in calculating a threshold for one or more steps of the first performance workflow 436b or the second performance workflow 438b. For example, the workflow 436b and/or the performance monitoring module 414 may use an expected level of performance for the workflow 436b to calculate a first threshold by multiplying the expected level of performance time by 1.2, and to calculate a second threshold by multiplying the may be used the expected level of performance time by 1.5. The performance monitoring module 414 may use the performance metrics it previously determined using the historical performance data 416 to establish an expected or baseline level of performance. Alternatively, the workflows 436*b* and 438*b* may use the performance metrics, e.g., previously determined by the performance monitoring module 414, to determine an expected or baseline level of performance.

As an example, the workflow 436*b* may use the performance monitoring module 414 to determine an average load time for data cubes over the last week using the historical performance data 416 and/or the previously determined performance metrics. As another example, the workflow 438*b* may use the performance monitoring module 414 to determine an average load time for data cubes on Fridays between 12:00 pm and 2:00 pm over the last four weeks using the historical performance data 416 and/or the previously determined performance metrics.

In detecting deviations in performance times, the workflow 436*b* or the workflow 438 may compare its threshold(s) with performance data collected or measured for the monitored data object. If the performance data associated with the monitored data object meets the one or more thresholds, a performance deviation may be detected. As mentioned above, a threshold may be an expected or baseline level of performance itself or may be calculated using an expected or baseline level of performance. The workflows 436*b* and 438*b* may use the performance monitoring module 414 to compare the thresholds with the collected or measured performance data.

As an example, the workflow 436*b* may detect a first performance deviation by comparing the load time of Cube 1 with a first threshold, and may detect a second performance deviation by comparing the load time of Cube 1 with a second threshold.

In stage (J), the customized workflows determine one or more actions to perform based on the detected performance deviations (428). Here, the customized workflows are the workflows 436*b* and 438*b*. The workflows 436*b* and 438*b* may provide an indication of what actions should be performed. These actions may have been default action, e.g., from the workflow publishing server 430, or may have been entered by the user 402 or a different user. For example, for the workflow 436*b*, the user 402 may have entered the action to schedule additional monitoring of Cube 1 when a first performance deviation is detected.

Alternatively or additionally, one or more of the actions may be automatically determined by the server 410, e.g., through the workflow 436*b* and/or the workflow 438*b*. The actions may be automatically determined by the server 410, e.g., through the workflow 436*b* and/or the workflow 438*b*, referring to a lookup table. In referring to a lookup table, the server 410, e.g., through the workflow 436*b* and/or the workflow 438*b*, may compare a type of performance deviation detected with one or more potential actions associated with the type of performance deviation. A type of performance deviation may be assigned or tagged to a set of conditions by default, e.g., by the workflow publishing server 430, or by the user 402 or another user. For example, in performing the operations of step 5 of the workflow 436*b*, the workflow 436*b* may refer to a lookup table stored on the server 410 or in the data storage 412. The performance deviation associated with step 5 of the workflow 436*b* may have been tagged, e.g., by the user 402, as a specific type of performance deviation such as severely poor performance. The workflow 436*b* may then refer to a lookup table and identify one or more actions that correspond with severely low performance. The workflow 436*b* may then proceed to perform one or more of the identified actions. As another example, the user 402 may have tagged the performance deviation associated with step 4 of the workflow 436*b* as poor performance.

As an example, based on the performance deviations detected, the first performance workflow 436*b* may determine to (i) schedule additional monitoring of Cube 1 when a first performance deviation is detected in step 4 of the workflow 436*b*, and/or (ii) notify an administrator that a performance deviation associated with Cube 1 has occurred when a second performance deviation is detected.

The workflows 436*b* and 438*b* may perform one or more of the determined actions automatically. For example, once the workflow 436*b* has determined that it should schedule additional monitoring of Cube 1 because the load time of Cube 1 was greater than 120% the normal load time for data cubes, the workflow 436*b* may automatically schedule the additional monitoring of Cube 1 and/or perform additional monitoring of Cube 1 without further input from, for example, the user 402.

The workflows 436*b* and 438*b* may recommend that the user 402 or another user perform one or more of the determined actions. For example, if the workflow 438*b* determines that an action includes changing a configuration of the server 410, the workflow 438*b* may generate and a send a notification to an administrator including an indication of the action to change the server 410's configuration instead of automatically changing the configuration. In this example, additional input from an administrator such as, for example, the user 402 may be needed in order for the action of changing the server 410's configuration to be performed.

FIG. 4B is a diagram that illustrates example historical performance data 416 to be used in performance deviation monitoring. As shown, the historical performance data 416 is presented in the form of a graph. The historical performance data 416 may be associated with a particular type of data object, e.g., data cubes, reports, dashboards, etc. The historical performance data 416 may be associated with a particular type of performance monitored, e.g., load time, rendering time, report time, etc. For example, the historical performance data 416 may indicate the average load time for all data cubes, or a particular subset of data cubes (e.g., based on data cube size), for a particular date and time. As shown, the graph representing the historical performance data 416 displays an average load time of data cubes (Y-axis) over the date and time when the load times were monitored (X-axis). As mentioned above, the historical performance data 416 may have been stored in the data storage 412 and retrieved by the performance monitoring module 414 in accordance with an operations of the workflows 436*b* and 438*b*.

The workflows 436*b* and 438*b*, e.g., by means of the performance monitoring module 414, may calculate an expected or baseline level of performance using the historical performance data 416. Here, the workflow 436*b* calculates a first expected level of performance. Specifically, the workflow 436*b* calculates a first normal load time for data cubes. In addition, the workflow 438*b* calculates a second level of performance. Specifically, the workflow 438*b* calculates a second normal load time for data cubes.

Although the workflows 436*b* and 438*b* are calculating an expected or baseline level of performance for the same type of data object, e.g., data cubes, and the same type of performance monitoring, e.g., load time, they may each calculate a respective expected or baseline level of performance differently one another. For example the workflow 436b may use a first set of one or more ranges of data from the historical performance data 416 in calculating an expected or baseline level of performance, and the workflow 438b may use second set of one or more ranges of data from the historical performance data 416 in calculating an expected or baseline level of performance. All or a portion of the first range set may fall within all or a portion of the second range set, may overlap all or a portion of the second range set, or may encompass all or a portion of the second range set.

As shown, the workflow 436b uses a first range 450 of data from the historical performance data 416 to calculate an average cube load time over the past week. Accordingly, the first range 450 corresponds with a range of average cube load times over the past week. Here, each X-axis grid line of the graph representing the historical performance data 416 may correspond with single day.

As shown, the workflow 438b uses a second range 460, a third range 462, a fourth range 464, and a fifth range 466 of data from the historical performance data 416 to calculate an average cube load time on Fridays between 12:00 pm and 2:00 pm over the last four weeks. The second range 460 corresponds with a range of average cube load times between 12:00 pm and 2:00 pm on the most recent Friday. The third range 462 corresponds with a range of average cube load times between 12:00 pm and 2:00 pm on the second most recent Friday. The fourth range 464 corresponds with a range of average cube load times between 12:00 pm and 2:00 pm on the third most recent Friday. The fifth range 466 corresponds with a range of average cube load times between 12:00 pm and 2:00 pm on the fourth most recent Friday.

Figure 5:
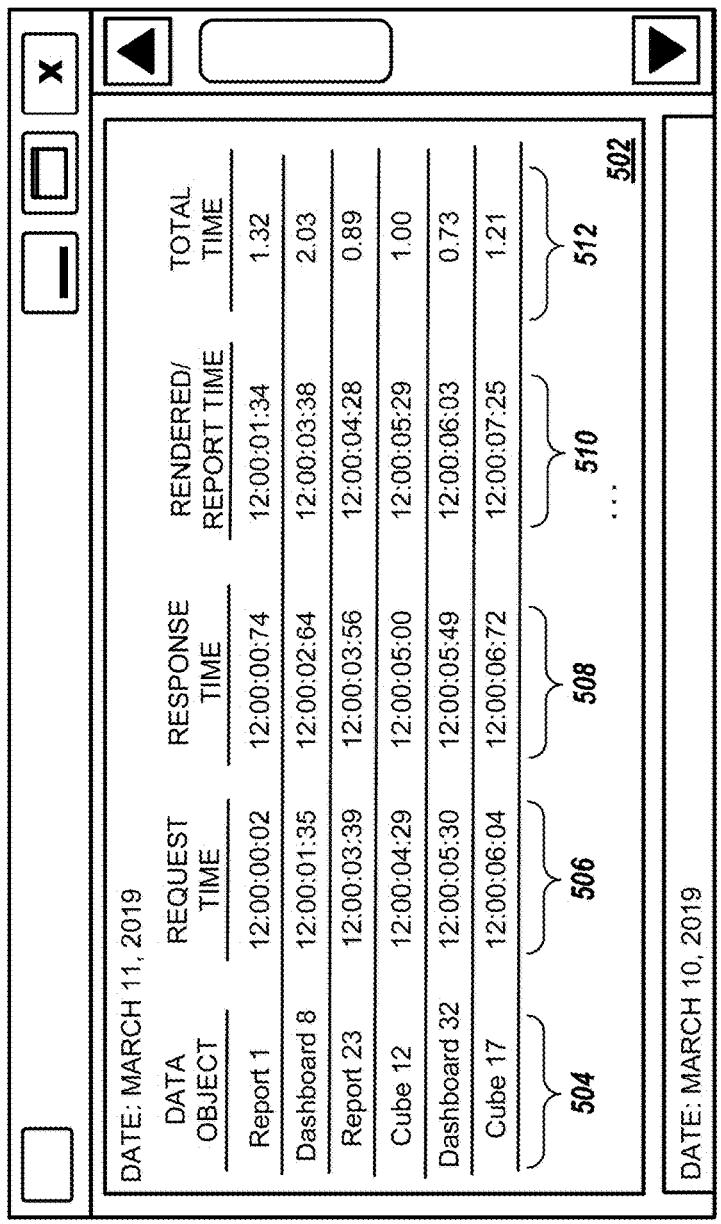
FIG. 5 is diagrams that illustrates an example interface displaying performance data.

FIG. 5 is diagrams that illustrates an example interface 500 displaying performance data.

As shown in FIG. 5, an interface 500 displays performance data. The performance data may have been stored in the data storage 412 as shown in FIG. 4A and accessed by the performance monitoring module 414. The performance data may be organized by date such that there is a window for each day or other specified time period (e.g., 12 hours, 2 days, 1 week, 10 days, 20 days, 1 month, etc.). Here, a window 502, for the date of Mar. 11, 2019, includes a list of various data objects 504, a list of monitored request times 506 for each of the data objects, a list of monitored response times 508 for each of the data objects, a list of rendering or report times 510 for each of the data objects, and a list of total times 512 for each of the data objects (e.g., amounts of time needed to perform the respective tasks). The list of total times 512 may represent a current performance metrics as calculated, for example, by the performance monitoring module 414 of the server 410. The values included in the list of the total times 512 may be in seconds.

The list of data objects 504 includes various data objects that may be requested by, for example, an end user. The various data objects may include, for example, data cubes, dashboards, reports, etc. Here, the name of each of the data objects (e.g., "Dashboard 8") in the list of data objects 504 may be associated with, for example, the task of generating that data object in response to a received request from an end user.

For each data object in the list of data objects 504, performance data associated with each data object may be monitored. This performance data may include request times as provided in the list of request times 506, response times as provided in the list of response times 508, and/or rendered or report times as provided in the list of rendering or report times 510. This performance data may be monitored by the performance monitoring module 414 shown in FIG. 4A. The performance monitoring module 414 may use this performance data to calculate one or more performance metrics such as, for example, a total time endured by an end user as provided in the list of total times 512.

Further scrolling through the window 502, e.g., by the user 402 as shown in FIG. 4A, may reveal additional performance data associated with the various data objects. The additional performance data may reveal additional request times within the list of request times 506, additional response times within the list of response times 508, additional rendering or reporting times within the list of rendering or reporting times 510, and/or additional total times within the list of total times 512 for generating the Report 1, the Dashboard 8, the Report 23, the Cube 12, the Dashboard 32, and the Cube 17. The additional performance data may reveal that repeated generation of the Report 1, the Dashboard 8, the Report 23, the Cube 12, the Dashboard 32, and the Cube 17 consistently and constantly throughout Mar. 11, 2019 in the stated order.

In some implementations, as indicated by the request times 506 and the rendered times 510, a request for a following data object of the list of data objects 504 may not be sent until the previous task of generating an earlier data object is complete, e.g., until the associated data object has been rendered for an end user. The request for the following data object of the list of data objects 504 may be sent immediately following the completion of the previous task of generating the earlier data object.

Figure 6:
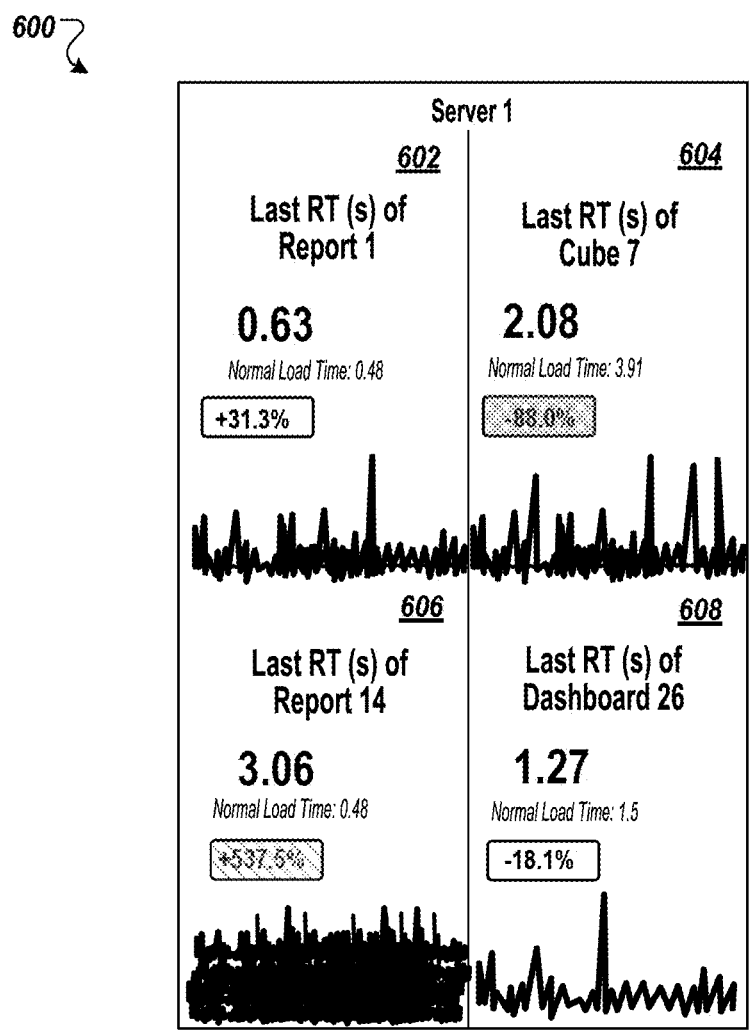
FIG. 6 is a diagram that illustrates an example interface displaying performance data and/or performance metrics.

FIG. 6 is a diagram that illustrates an interface 600 displaying a simplified view of performance data and/or calculated performance metrics. The performance data and calculated performance metrics correspond with data objects on a first server ("Server 1"). This first server may be the server 410 as shown in FIG. 4A.

The interface 600 is broken up into multiple sections 602-608, where each section corresponds with a particular monitored data object. There is a first section 602 that corresponds with a Report 1, a second section 604 that corresponds with a Cube 7, a third section 606 that corresponds with a Report 14, and a fourth section 608 that corresponds with a Dashboard 26. Each section of the sections 602-608 includes performance data and/or calculated performance metrics for its corresponding data object. For example, the performance data may include request times, response times, rendering times, report times, etc. As an example, the calculated performance metrics may include a monitored load time, prior load times, prior load times over date and time, percent changes in load time, total time between a request time and a render or report time, average load time, prior total times, prior total times over date and time, average total time, an expected or baseline level of performance for a type of data object, etc.

The performance data and/or the performance metrics may be displayed using various interface elements. These interface elements may include one or more icons, text, and/or graphs. One or more interface elements may change depending on various circumstances. For example, an interface element may look a first way when no performance deviation is detected, may look a second way when a first performance deviation is detected, may look a third way when a second performance deviation is detected, etc. As shown, the section 602 includes an interface element indicating the most recent load time for Report 1 of 0.63 seconds, an interface element indicating a normal load time for reports of 0.48 seconds, an interface element for a percent difference between the most recent load time of Report 1 and the normal load time for reports of +31.3%, and a graph interface element for the stored load times of Report 1 over time. The interface element for the percent difference is clear. This may indicate that no performance deviation was detected although the load time for Report 1 was greater than the normal load time for reports. No performance deviation may have been detected due to, for example, a threshold level of performance for reports being set for a percentage difference greater than 31.3%.

As shown, the section 604 includes an interface element indicating the most recent load time for Cube 7 of 2.08 seconds, an interface element indicating a normal load time for data cubes of 3.91 seconds, an interface element for a percent difference between the most recent load time of Cube 7 and the normal load time for data cubes of −88.0%, and a graph interface element for the stored load times of Cube 7 over time. The interface element for the percent difference is shaded in a first manner or is displayed with a first color. This may indicate that a performance deviation was detected based on the percentage difference. A performance deviation may have been detected due to, for example, the percentage difference of −88.0% meeting or being greater in magnitude than a threshold percentage difference. Here, the performance deviation may be associated with a particular type of performance deviation based on, for example, the threshold(s) that was met. For example, the threshold(s) that was met may have been tagged as a threshold for unusually high performance.

As shown, the section 606 includes an interface element indicating the most recent load time for Report 14 of 3.06 seconds, an interface element indicating a normal load time for reports of 0.48 seconds, an interface element for a percent difference between the most recent load time of Report 14 and the normal load time for reports of +537.5%, and a graph interface element for the stored load times of Report 14 over time. The interface element for the percent difference is shaded in a second manner different than the first manner or is displayed with a second color different than the first color. This may indicate that another performance deviation was detected based on the percentage difference. A performance deviation may have been detected due to, for example, the percentage difference of +537.5% meeting or being greater in magnitude than a threshold percentage difference. Here, the performance deviation may be associated with a particular type of performance deviation based on, for example, the threshold(s) that was met. For example, the threshold(s) that was met may have been tagged as a threshold for poor performance and/or severely poor performance.

As shown, the section 608 includes an interface element indicating the most recent load time for Dashboard 26 of 1.27 seconds, an interface element indicating a normal load time for dashboards of 1.5 seconds, an interface element for a percent difference between the most recent load time of Dashboard 26 and the normal load time for dashboards of −18.1%, and a graph interface element for the stored load times of Dashboard 26 over time. The interface element for the percent difference is clear. This may indicate that no performance deviation was detected although the load time for Dashboard 26 was less than the normal load time for dashboards. No performance deviation may have been detected due to, for example, a threshold level of performance for reports being set for a percentage difference less than −18.1%.

FIG. 7 is an example table 700 displaying relationships between server conditions, causes, and solutions. The table 700 may be a lookup table or represent mapping data referred to by the server 410 shown in FIG. 4A. The table 700 may be specific to the server 410. The table 700 may be specific to a particular server environment of the server 410.

As shown, the table 700 includes a list of performance deviations 702. The list of performance deviations 702 may include poor performance, severely poor performance, unusually high performance, etc. The list of performance deviations 702 may be generated by, for example, the user 402 for the server 410 as shown in FIG. 4A. The list of performance deviations 702 may include performance deviations that were generated, tagged, or labelled for one or more workflows. The table 700 also includes a list of potential causes 704 for the performance deviations. The table 700 also includes a list of actions 706 that correspond with the performance deviations in the list of performance deviations 702 and the potential causes in the list of potential causes 704.

A workflow running on a server may refer to the table 700 to determine one or more actions to take or recommend based on a detected performance deviation. When a workflow identifies one or more actions using the table 700, the workflow may perform one or more of the identified actions automatically. For example, the workflow may identify the action to update server software based on a poor performance deviation being detected and may automatically initiate the update of the server software for the corresponding server.

When a workflow identifies one or more actions using the table 700, the workflow may recommend to a user or administrator of the corresponding server to perform the one or more identified actions. For example, the workflow may identify the action to recover or re-download one or more data objects due to an unusually high performance deviation being detected. In this example, the workflow may proceed to generate and send a notification to an administrator of the corresponding server to recover or re-download one or more data objects.

As shown, there are a number of potential causes within the list of potential causes 704 for a poor performance deviation and a number of actions that may help prevent further performance deviations. These potential causes include, for example, out-of-date software, running Service A Version 1.0 at the same time as Service B Version 1.0 on the corresponding server, the corresponding server reaching capacity limits, a surge in user traffic on the corresponding server, or hardware failure. These potential actions include, for example, updating server software, updating the Service A to Version 2.0, updating server settings to prevent Service A and Service B from running at the same time, or updating a server configuration, e.g., by increasing cache size, allocating more RAM, etc.

As shown, there are a number of potential causes within the list of potential causes 704 for an unusually high performance deviation and a number of actions that may help prevent further performance deviations. These potential causes include, for example, missing data or the corruption of one or more data objects. These potential actions include, for example, recovering or re-downloading the missing data, updating a link or reference to the data, reloading one or more data objects, reinstalling the server software, or updating the server software.

In some implementations, an action for a particular performance deviation and cause is preferred over another action for the same performance deviation and cause. An action may be preferred over another action due to having been successfully tested, due to having a higher rate of success, due to not requiring critical systems and services to be shut down, due to the time of day, due to the load on the system, etc. For example, an action that has a higher rate of success but affects critical systems of the third-party server may not always be chosen by a workflow. In this example, the current load on the server may be high and/or the time of day indicates that there is an anticipated high load. Accordingly, an action with a lower chance of success, but one that does not affect critical systems or services may be preferred at this time and/or may be selected by the workflow. The table 700 may reflect these preferences. For example, the list of actions 706 may be arranged based on preference.

The table 700 may be updated over time. The table 700 may be updated using statistical data. Using this approach, the table 700 may be updated automatically. For example, the server 410 may update the table 700 based on the success or failure of an action to prevent later performance deviations for a given data object. As another example, the server 410 may access past user data that contains actions performed by users of the server 410. With this data, a workflow running on the server 410 may determine what actions are usually performed for a given detected performance deviation and may update the table 700 accordingly, e.g., may add new actions, may change the order of actions, may remove actions that are never used, etc. Accordingly, the statistical data may be used to by the server 410 to recommend some actions over other actions, e.g., to determine an order of actions for a given performance deviation and/or potential cause.

The table 700 may be also be updated when new conditions are detected. For example, the table 700 may be updated when new software becoming available, a change in server configuration is detected, new or different server hardware is being used or allocated, and/or new or different software or services are being run on the server or on a particular server environment. These updates may be performed automatically.

The table 700 may also or alternatively be updated by a user of the corresponding server, such as the user 402 shown in FIG. 4A. The user 402 may update the table 602 based on the success or failure of one or more actions in preventing later performance deviations.

The table 700 may also or alternatively be update using machine learning. For example, the server 410 shown in FIG. 4A may use one or more machine learning models to determine what actions to take based on, for example, the models analyzing past actions taken by users of the server 410 and the performance data associated with data objects. The one or more machine learning models may be used to update the table 700 by, for example, recommending that new actions be added, changing the order of actions, remove actions that are unlikely to prevent later deviations, etc. Accordingly, the machine learning models may be used to by the server 410 to recommend some actions over other actions, e.g., to determine an order of actions for a given performance deviation and/or potential cause.

In some implementations, the table 700 corresponds with a particular type of performance monitoring, e.g., load times, rendering times, reporting times, etc. In some implementations, the table 700 corresponds with a particular type of data object, e.g., data cubes, reports, dashboards, etc.

Figure 8:
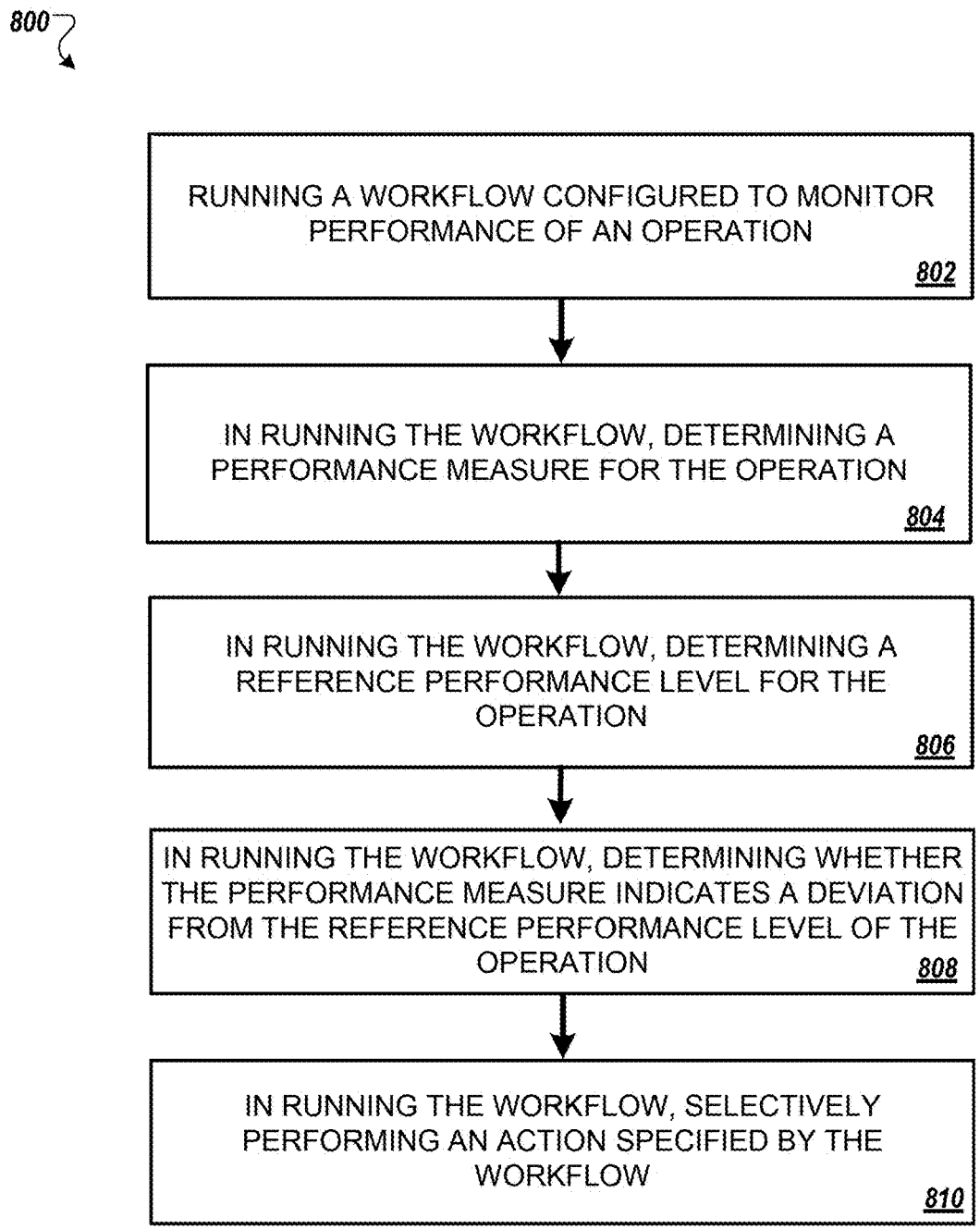
FIG. 8 is a flowchart diagram illustrating an example process for monitoring performance deviations.

FIG. 8 is a flowchart diagram illustrating an example process 800 for monitoring performance deviations. For example, the process can be used to detect, assess, and respond to (e.g., reduce, remove, or warn about) performance changes, especially decreases in performance that are outside the typical range expected for a computer system. The process 800 can be performed by one or more computers. The process 800 can be performed, at least in part, using the system 400 described herein. For example, the process 800 can be performed by the server 410 using the performance data 412 shown in FIG. 4A.

The process 800 can enable a computer system to monitor itself and take appropriate action when significant performance decreases occur. As discussed above, the workflow publishing server 430 shown in FIG. 4A provides different workflow modules that can be downloaded and used by different systems. Workflow modules used for monitoring can be portable, distributable, and can operate together, allowing customization of monitoring of the system that runs the workflow or one or more external systems. An administrator can select from the library or collection of published workflows for monitoring different aspects of performance to apply a customized set of monitoring workflows to measure and respond to performance changes.

The workflows may be configured to customize their characteristics and operation for the specific characteristics and history of each system that they run on. For example, a workflow may include operations (or specified rules, scoring criteria, etc.) to generate reference performance levels for the workflow to use, based on the monitored performance or performance history of the system the workflow is monitoring. For example, a workflow may specify to access previously monitored load times (e.g., for a data cube, document, or other resource) specified in the performance data 412, may take a subset of those previously monitored load times (e.g., based on a specific criteria in the workflow, a current date/time, current software versions, current traffic levels, etc.), and use the subset of previously monitored load times to calculate a normal load time (e.g., a reference performance level) to be used in running the workflow. Because the workflow module customizes its reference performance levels automatically, the same module, when provided to and run by different systems, can set different reference performance levels for the different systems. This helps detect events and conditions that are significant for the particular system being monitored (e.g., the server 410), while in effect filtering out performance changes and conditions that are minor or are normal for the system. For example, due to limited processing resources available to the server 410, the response times and/or retrieval and loading times by the server 410 may be larger than is typical for other systems. The workflows may take this into account by generating reference performance levels that are typical of the server 410.

The ability of performance-monitoring workflow packages to specify and generate their own reference levels also enhances the redistributability of the workflow packages. The workflow need not assume a static or absolute level of performance is needed. Even without knowing the actual performance of a system in advance when the workflow is designed, a workflow can still be effectively designed and deployed. For example, the use of a performance measure relative to prior performance can allow the same module, without user intervention or adjustment in setting up the module, to detect and respond to increase in response time of at least 25% of normal levels, regardless of whether the typical response time is 0.1 seconds, 1 second, or 10 seconds. Of course, the workflow modules can provide the option to customize the reference levels used and to specify specific values or static values for reference performance levels when desired.

The process 800 includes running a workflow configured to monitor performance of an operation (802). The workflow can be run on, for example, the server 410 shown in FIG. 4A. The server 410 may run the workflow in response to one or more events occurring, or only after one or more events have occurred. For example, the server 410 may run the workflow in response to receiving a workflow module, e.g., the workflow 436*a* or the workflow 438*a*, from the workflow publishing server 430. The workflow module may be sent by the workflow publishing server 430 to the server 410 as, for example, a single redistributable data package. Alternatively, the workflow may be run in response to receiving instructions from the user device 404 to run the workflow, and/or user input from the user device 404 modifying the workflow. The instructions or user input may specify a data object that the workflow (e.g., the modified workflow) is to be performed with, such as a data cube. Similarly, the instructions or user input may specify the operation that the workflow is configured to monitor the performance of.

As an example, as shown in FIG. 4A, the server 410 may run a modified workflow 436*b* with a first data cube after receiving user input to make modifications to the workflow 436*a*, modifying the workflow 436*a* in accordance with the user input (e.g., adding an action to schedule monitoring, adding an action to notifying an administrator, and specifying that normal operation should be defined as the average performance over the last week), and receiving instructions from the user device 404 to run the workflow 436*b* with the first data cube such that the performance of the operation with the first data cube will be monitored and/or analyzed in accordance with the workflow 436*b*.

The operation may include, for example, loading a document, creating a data cube, responding to a query, retrieving a file, providing data for a dashboard, or generating a report or visualization. The operation may be part of the workflow. As an example, the instructions or user input that are used to trigger the running of the workflow may include an indication that the workflow should be performed with a particular document. The workflow itself may include an operation to measure the load time for the data object named. As such, in running the workflow, the load time for loading the particular document may be observed (e.g., by the server 410 shown in FIG. 4A). As described below, this data can be used to determine the performance of this operation and/or the performance of this operations with a particular data object.

In some cases, the workflow is configured to monitor performance of multiple operations. For example, the workflow may include a first operation to retrieve a document and a second operation to measure the load time for the document. Therefore, in running the workflow, the retrieval time in addition to the load time may be observed (e.g., by the server 410 shown in FIG. 4A). As described below, this data can be used to determine the performance of these operations and/or the performance of these operations with a particular data object.

The process 800 includes, as part of running the workflow, determining a performance measure for the operation (804). For example, the server 410 can calculate a value that describes a characteristic of the manner in which the operation was performed or the results of performing the operation. The performance measure to be obtained may be specified in the workflow. For example, the workflow may specify a type of performance measure that is to be determined (e.g., observed, or calculated from observations). As an example, with respect to FIG. 4A, the workflow 436*b* specifies in its first operation a performance measure that is a score or measurement of a task completion time (e.g., load time) to load the corresponding data object (e.g., the first data cube). The performance measure may be monitored (e.g., by the server 410 shown in FIG. 1) during the performance of the operation. For example, the server 410 may monitor the load time for the first data cube by loading the first data cube. Specifically, in running the workflow, the server 410 may initiate loading the first data cube and record a corresponding start time for the operation. In running the workflow, the server 410 may detect when the first data cube has been successfully loaded and record a corresponding end time for the operation. From this, the server 410 can determine the performance measure (e.g., the load time) as the difference between the end time and the start time.

The performance measure can be indicative of latency, response time, task completion time, transmission time, data rate, bandwidth usage, capacity, reliability, accuracy, efficiency, availability, power usage, processing speed, throughput, or level of concurrency, e.g., observed during the performance of the operation on one or more data objects. As an example, the performance measure may be a response time to retrieve a particular document. This performance measure may also, however, be indicative of one or more other performance measures, such as a maximum user capacity of a server system that stores the document, throughput of a server system that stores the document, efficiency of a server system that stores the document, etc.

In some implementations, the workflow may indicate multiple performance measures to be determined. In addition, in some implementations, the performance measure(s) may be determined for a combination of operations. For example, performance may be determined for a single operation or a sequence of operations.

The process 800 includes, as part of running the workflow, determining a reference performance level for the operation (806). As discussed above, the reference performance level may be an expected or baseline performance level for the computer system running the workflow. In some implementations, the performance level may be a static value, such as a minimum acceptable level of performance. In other implementations, the performance level may be a dynamically calculated value that is tailored for the specific computer system being monitored and its historical performance. For example, the reference performance level can be calculated based on one or more recent performance tests for the computer system, so the reference performance level is based on a level of performance that the computer system actually achieved over a period of time. The prior performance measures may optionally be adjusted (e.g., increased by 20%, a certain margin or offset added, etc.) to set a reference level at a desired relationship from the measured performance.

The reference performance level, or a manner of calculating or otherwise obtaining the reference performance level, may be specified in the workflow. For example, with respect to FIG. 4A, the workflow 436*b* indicates that the reference performance level (e.g., the normal load time) is set to the average load time of a corresponding data object (or multiple data objects) over the past week. The reference performance level may be specified by, for example, the user 402 in their customization/modification of the workflow 436*a*. The reference performance level may be defined as an average value of monitored (or calculated) performance measures over a particular period time or a number of observations. For example, instead of the reference performance level being defined as the average load time over the past week in the workflow 436*b*, it may be defined as the average load time over the last ten observed load times (e.g., for the particular data object).

Similarly, the reference performance level may be a typical performance level. That is, the performance level may be defined as the median value or the mode value of multiple observed (or calculated) performance measures over a particular period of time or a number of observations. For example, instead of the reference performance level being defined as the average load time over the past week in the workflow 436*b*, it may be set to the load time that most commonly occurred (e.g., load times that match or that substantially match) over the last hundred observed load times (e.g., for the particular data object).

In some cases, the reference performance level is an average, median, or mode value for all available observations (or calculations) of performance measures. For example, instead of the reference performance level being defined as the average load time over the past week in the workflow 436*b*, it may be defined as the average load time across all observed load times (e.g., for the particular data object) regardless of when those load times occurred.

In some cases, the reference performance level is an average, median, or mode value for observations (or calculations) of performance measures for a particular software version of the computer system running the workflow (and/or of computer systems or devices that the workflow interacts with, such as user devices, external servers, etc.). For example, with respect to FIG. 4A, the reference performance level may be defined as the average load time across all observed load times (e.g., for the particular data object) since the software of the server 410 was upgraded to the most recent version.

In some cases, the reference performance level is an average, median, or mode value for observations (or calculations) of performance measures for particular dates and/or times. For example, with respect to FIG. 4A, the reference performance level may be defined as the average load time across all observed load times (e.g., for the particular data object) on Monday, Tuesday, Wednesday, and Thursday between 5:00 pm and 9:00 pm.

In some cases, the reference performance level is a set value such as predefined acceptable performance level. For example, with respect to FIG. 4A, the user 402 may use the user device 404 to set the normal load time for the first data cube to 3.1 seconds. Alternatively, an acceptable performance level may be provided in the workflow, e.g., as stored in the workflow libraries 434 of the data storage 432. The acceptable performance level may have been set by a user that originally uploaded, or uploaded an earlier version of, the workflow to the workflow publishing server 430. In some cases, the acceptable performance level may be automatically determined by a computer system, such as the workflow publishing server 430 or the server 410. For example, the server 410 may use the performance data 412 to determine what is an acceptable load time for a data object (or for a particular data object). Specifically, the server 410 may use the performance data 412 to determine an acceptable performance level by calculating an average load time from previous observed load times for various data objects.

In some cases, the reference performance level is a maximum or minimum observed value. For example, with respect to FIG. 4A, the reference performance level for the workflow 436*b* may be set to the minimum load time observed over the past week.

In some cases, the workflow includes a default reference performance level. For example, with respect to FIG. 4A, the workflow 436*a* may include a default reference performance level of the average load time of a specified data object(s) over the past month. The user input that is used to generate the modified workflow 436*b* may indicate that the reference performance level should be changed from the default one-month average load-time to the one-week average load time.

As an example, in determining the reference performance level, the server 410 may use the performance data 412. The performance data 412 may store previously observed performance measures (or data from which performance measures can be calculated or extracted), such as previous load times of the first data cube.

Just as performance measures can be determined for different aspects of performance, a workflow can specify corresponding reference performance levels to be determined for the different aspects of performance (e.g., latency, response time, task completion time, transmission time, data rate, bandwidth usage, capacity, reliability, accuracy, efficiency, availability, power usage, processing speed, throughput, level of concurrency, etc.) Similarly, a workflow can specify that reference performance levels should be determined based on different periods of time or that a reference performance level should be determined for each of multiple periods of time (e.g., the prior day, the prior week, the prior month, the prior year, etc.).

The process 800 includes, as part of running the workflow, determining whether the performance measure indicates a deviation from the reference performance level of the operation (808). For example, the workflow can detect when performance of the computer system deviates from a range or level representing the bounds of expected or acceptable performance. Not all changes in performance may qualify as a deviation that triggers action or further processing using a workflow. For example, a performance measure that is only nominally above or below a reference performance level may not be considered a deviation from the overall performance level. Similarly, a single performance test indicating a brief, temporary change from a desired performance level may not be considered a deviation that requires action by the workflow. As a result, the detection of a deviation from the desired performance level may involve further determining the magnitude or extent of the change (e.g., how far the performance measure is from the reference performance level), the duration that the change persists (e.g., length of time or number of successive tests in which a reference threshold is exceeded), a breadth or scope affected (e.g., whether at least a minimum amount of resources, data sets, client devices, subsystems, or other elements are affected), and so on.

The workflow may specify conditions or characteristics that constitute a deviation from the desired or expected performance level, including factors such as a magnitude, duration, and/or scope of a performance issue for a deviation to be detected. For example, with respect to FIG. 4A, the workflow 436*b* may specify a first type of deviation to be a performance score greater than 120% of the reference performance level (e.g., 20% over the typical or expected score), and a second type of deviation to be a performance score greater than 150% the reference performance level. A deviation may be defined as a percentage change from the reference performance level, or a set value change from the performance level (e.g., greater than 1.0 second from a typical load time of 2.2 seconds). In some cases, a deviation may be detected using one or more algorithms (e.g., a machine learning algorithm, or a static algorithm). For example, an algorithm may receive the performance measure and the reference performance level as input, and may output a value indicating that a deviation has occurred or that a deviation has not occurred. For example, an output of the algorithm between 0 and 1.0 may indicate that no deviation has occurred, and an output greater than 1.0 may indicate that a deviation has occurred.

In some cases, a deviations is defined as a predetermined percentage change from the reference performance level. This predetermined percentage change may be applicable to the workflow, and, optionally, to all workflows (e.g., unless a different deviation is specified in the workflow itself). For example, a deviation may be defined by default as occurring when the performance measure changes ±5% with respect to the reference performance measures.

Detecting a deviation can include comparing the performance measure to the reference performance level, or to a modified reference performance level. For example, the server 410 can create a modified reference performance level based on how a deviation is defined. Specifically, the server 410 can multiply the reference performance level by 120% to obtain a modified reference performance level. The server 410 can proceed to compare the measured load time with the modified performance level to determine if a deviation has occurred.

The process 800 includes, as part of running the workflow, selectively performing an action specified by the workflow (810). The action specified may be based on whether the performance measure is determined to indicate a deviation from the reference performance level. That is, the action may correspond to the deviation. For example, with respect to FIG. 4A, an action of notifying an administrator of the poor load time if the measured load time (e.g., the performance measure) is determined to exceed 150% the normal load time (e.g., the reference performance level). The action may be predetermined, e.g., may be or be part of an operation of the workflow 436*a* as stored by the workflow publishing server 430. Similarly, the action may be modified and/or added to the workflow by the user 402 through the user device 404.

The workflow may specify any of various different actions to be performed in response to detecting a performance deviation. As discussed above, a workflow may define different types of performance deviations or performance conditions to detect (e.g., short-term, long-term, high magnitude, low magnitude, different levels of urgency to address, changes with respect to different performance aspects, etc.). The workflow may specify different actions to be performed in response to different types of performance deviations detected. Similarly, the workflow may specify that actions are conditional on the conditions or context present when a performance deviation is detected. For example, the workflow may specify that, if low performance is detected, a first action should be performed if load on the server is above a certain level, but a different, second action should be performed instead if low is below the level.

As illustrated in FIG. 4A, the action in response to a performance deviation may include the generation and transmission of a notification to a user (e.g., a particular user, such as an administrator). as another example, one or more computing environments may be shut down, suspended, or restarted in response to detecting a deviation. As another example, the workflow may specify that traffic or workload should be redistributed among systems to improve performance. As another example, the workflow may cause load balancing actions, such as starting up one or more new instances of a server environment in a cloud computing system to share load and restore response times to a typical level. Other actions can include checking for software updates, and/or initiating software updates. For example, in response to detecting a performance deviation (e.g., in throughput of a particular server environment of the server 410), the server 410 may check to see if there are any software (e.g., operating system) updates available for the server environment. If there are, the server 410 may initiate the software update for the server environment. In this example, the server 410 may also repeat the running of the workflow (e.g., as an additional action) to check whether the update had an effect (e.g., ideally improved) on the performance measure.

The action that the workflow causes to be performed may be an action that is meant to improve computing performance. For example, the action may include allocating additional resources to a particular server or computing environment (e.g., allocating more processors or memory for a cloud computing environment), changing configuration settings of the particular server or computing environment, assigning users to a different server or computing environment (e.g., to better balance load or improve user experience), and/or updating software of the server or computing environment or of a device that interacts with the server or computing environment. As another example, the workflow may refresh a cache of a system, place copies of certain data in a cache, expand the size of the cache, or otherwise take actions to improve performance. The action may be correspond to or address the type of performance deviation detected. For example, if the server 410 detects a response time that is 200% greater than the average response time for Mondays between 4:00 pm and 8:00 pm over the past month for a particular server environment hosted by the server 410, then the server 410 may perform an action specified in the corresponding workflow to clear the cache of the server environment and/or to allocate additional memory (e.g., RAM) to the server environment in an effort to reduce the response time.

In some cases, the process 800 includes storing the performance measure. The stored performance measure can be used in a later iteration or monitoring cycle to determine a reference performance level. For example, with respect to FIG. 4A, the server 410 may store the measured load time in the performance data 412. This measured load time can then later be referenced by the server 410 to generate one or more reference performance levels. For example, the server may run the workflow 436*b* again at a later time (e.g., the workflow 436*b* may be run periodically every twelve hours, every day, every week, etc.). During a subsequent running of the workflow 436*b*, the server 410 may again reference the previously monitored load times stored in the performance data 412 that now include the performance measure (e.g., the last load time measured during the immediately preceding performance of the workflow 436*b*). Accordingly, the reference performance measure (e.g., the average load time over the past week) calculated by the server 410 for this performed iteration of the workflow 436*b* differs from the previously calculated reference performance measure.

The performance measure may be stored with contextual information that can be used to generate reference performance levels. This contextual information may be used to account for particular trends in performance measures that may be affected by the time of day, day of week, time of year, operating system software, network traffic, etc. For example, with respect to FIG. 4A, the server 410 may store the load time for the first data cube in the performance data 112 along with one or more of the day or date when the load time was monitored, a time when the load time was monitored, the specific server environment or computing environment that stored the first data cube, the operating system software version of the server 410 (or of an external computing system or device interacting with the server 410), the networking traffic on the server 410 or a particular server environment or computing environment of the server 410 when the load time was monitored, etc. When the workflow 436*b* is subsequently run by the server 410, the server 410 may generate a reference performance level (e.g., a normal load time) by taking the average load time of previously monitored load times that were, for example, monitored during the same time of day or within a time period of the time of day as the current time, monitored during the same day of the week, monitored during the same month of the year as a current month of the year or season of the year as a current season of the year, monitored less than a predetermined amount of time from a current time (e.g., monitored less than a week ago, a month ago, six months ago, etc.), monitored with a level of network traffic that is the same or is substantially the same as a current level of network traffic, and/or monitored since the server 410 operating system's software version was updated to the current version (and/or the software of another computing system or device that interacts with the server 410 was updated to the current version).

Various examples show that the workflow can monitor performance for the computer system on which the workflow runs. In some implementations, the workflow can monitor another system or device, which may be associated with the system running the workflow or may be separate. For example, a server may use a workflow to monitor the performance of its associated database server, file system, network, and so on. Similarly, a server may run a workflow to monitor and test performance of other servers, of client devices, or of other systems, even of systems that do not run the performance monitoring workflow.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
    receiving, by the one or more computers, a data package over a communication network, the data package specifying a workflow to monitor performance of a particular type of operation, wherein the data package specifies criteria to determine, for a system that runs the workflow, a customized performance baseline based on a plurality of historical performance measures for the system that runs the workflow, and wherein the data package specifies multiple different management actions to improve performance in response to different levels of difference in performance with respect to the customized performance baseline; and
    in response to receiving the data package over the communication network, running, by the one or more computers, the workflow specified by the data package to monitor performance of an operation of the particular type by of the one or more computers, wherein running the workflow comprises:
        initiating the operation of the particular type;
        determining a performance measure for the operation initiated as part of the workflow;
        determining a customized performance baseline for the operation for the one or more computers based on the criteria specified in the data package, wherein the criteria specifies that the customized performance baseline is determined from previous performance measures for each of multiple instances of the one or more computers performing the operation;
        determining a level of difference between the performance measure for the operation and the customized performance baseline for the operation;
        selecting a management action, from among the multiple different management actions that the data package specifies, that corresponds to the determined level of difference in performance with respect to the customized performance baseline; and
        performing, by the one or more computers, the selected management action corresponding to the determined level of difference in performance to increase the performance of the operation for the one or more computers.

2. The method of claim 1, wherein the performance measure is specified by the data package and is indicative of latency, response time, task completion time, transmission time, data rate, bandwidth usage, capacity, reliability, accuracy, efficiency, availability, power usage, processing speed, throughput, or level of concurrency.

3. The method of claim 1, comprising repeatedly performing the workflow to monitor performance of multiple instances of the operation at different times.

4. The method of claim 3, comprising periodically initiating the operation based on the data package and monitoring the performance of the periodic instances of the operation.

5. The method of claim 1, wherein the workflow is configured to monitor an operation involving a specific data object, data set, document, application, service, or user.

6. The method of claim 1, wherein the workflow specifies an action to be taken in response to detecting that the performance measure indicates performance that is higher than the customized performance baseline by at least a minimum amount.

7. The method of claim 1, wherein the workflow specifies an action to be taken in response to detecting that the performance measure indicates performance that is less than the customized performance baseline by at least a minimum amount.

8. The method of claim 1, wherein the customized performance baseline is determined based on a previous performance of the one or more computers during a sliding window of time.

9. The method of claim 1, wherein the operation comprises:
    loading a document;
    creating a data cube;

responding to a query;
retrieving a file;
providing data for a dashboard; or
generating a report or visualization.

10. The method of claim 1, wherein the data package for the workflow specifies that the selected management action is conditional, to be performed when a particular condition or context is present in addition to a level of performance difference from the customized performance baseline; and
wherein performing the selected management action is further based on determining that the particular condition or context is present for the one or more computers.

11. The method of claim 1, wherein the data package specifies different configuration settings to apply in response to detection of different levels of difference in performance with respect to the customized performance baseline; and
wherein performing the selected management action comprises applying a configuration setting selected from among the different configuration settings based on the determined level of difference with respect to the customized performance baseline.

12. The method of claim 1, wherein the selected management action comprises restarting a computing environment.

13. The method of claim 1, wherein the selected management action comprises changing a distribution of tasks or traffic among multiple computing systems.

14. The method of claim 1, wherein the selected management action comprises starting one or more new instances of a server environment in a cloud computing system.

15. The method of claim 1, wherein the selected management action comprises checking for, downloading, or initiating a software update for the one or more computers.

16. The method of claim 1, wherein the selected management action comprises increasing an allocation of additional computing resources to the one or more computers.

17. A system comprising:
one or more computers; and
one or more computer-readable media storing instructions that, when executed by the one or more computers, cause the one or more computers to perform operations comprising:
receiving, by the one or more computers, a data package over a communication network, the data package specifying a workflow to monitor performance of a particular type of operation, wherein the data package specifies criteria to determine, for a system that runs the workflow, a customized performance baseline based on a plurality of historical performance measures for the system that runs the workflow, and wherein the data package specifies multiple different management actions to improve performance in response to different levels of difference in performance with respect to the customized performance baseline; and
in response to receiving the data package over the communication network, running, by the one or more computers, the workflow specified by the data package to monitor performance of an operation of the particular type by of the one or more computers, wherein running the workflow comprises:
initiating the operation of the particular type;
determining a performance measure for the operation initiated as part of the workflow;
determining a customized performance baseline for the operation for the one or more computers based on the criteria specified in the data package, wherein the criteria specifies that the customized performance baseline is determined from previous performance measures for each of multiple instances of the one or more computers performing the operation;
determining a level of difference between the performance measure for the operation and the customized performance baseline for the operation;
selecting a management action, from among the multiple different management actions that the data package specifies, that corresponds to the determined level of difference in performance with respect to the customized performance baseline; and
performing, by the one or more computers, the selected management action corresponding to the determined level of difference in performance to increase the performance of the operation for the one or more computers.

18. The system of claim 17, wherein the performance measure is indicative of latency, response time, task completion time, transmission time, data rate, bandwidth usage, capacity, reliability, accuracy, efficiency, availability, power usage, processing speed, throughput, or level of concurrency.

19. One or more non-transitory computer-readable media storing instructions that, when executed by the one or more computers, cause the one or more computers to perform operations comprising:
receiving, by the one or more computers, a data package over a communication network, the data package specifying a workflow to monitor performance of a particular type of operation, wherein the data package specifies criteria to determine, for a system that runs the workflow, a customized performance baseline based on a plurality of historical performance measures for the system that runs the workflow, and wherein the data package specifies multiple different management actions to improve performance in response to different levels of difference in performance with respect to the customized performance baseline; and
in response to receiving the data package over the communication network, running, by the one or more computers, the workflow specified by the data package to monitor performance of an operation of the particular type by of the one or more computers, wherein running the workflow comprises:
initiating the operation of the particular type;
determining a performance measure for the operation initiated as part of the workflow;
determining a customized performance baseline for the operation for the one or more computers based on the criteria specified in the data package, wherein the criteria specifies that the customized performance baseline is determined from previous performance measures for each of multiple instances of the one or more computers performing the operation;
determining a level of difference between the performance measure for the operation and the customized performance baseline for the operation;
selecting a management action, from among the multiple different management actions that the data package specifies, that corresponds to the determined level of difference in performance with respect to the customized performance baseline; and performing, by the one or more computers, the selected management action corresponding to the determined level of difference in performance to increase the performance of the operation for the one or more computers.

\* \* \* \* \*